United States Patent
Kong et al.

(10) Patent No.: US 8,397,118 B2
(45) Date of Patent: Mar. 12, 2013

(54) METHOD OF AUTOMATIC REPEAT REQUEST (ARQ) IN COMMUNICATION SYSTEM

(75) Inventors: Tae Gon Kong, Anyang-si (KR); Yong Ho Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 411 days.

(21) Appl. No.: 12/596,398

(22) PCT Filed: Apr. 18, 2008

(86) PCT No.: PCT/KR2008/002217
§ 371 (c)(1),
(2), (4) Date: Oct. 16, 2009

(87) PCT Pub. No.: WO2008/130159
PCT Pub. Date: Oct. 30, 2008

(65) Prior Publication Data
US 2010/0131817 A1 May 27, 2010

Related U.S. Application Data

(60) Provisional application No. 60/912,886, filed on Apr. 19, 2007.

(30) Foreign Application Priority Data

May 8, 2007 (KR) ........................ 10-2007-0044487

(51) Int. Cl.
*G06F 11/00* (2006.01)
(52) U.S. Cl. ........................ 714/748; 714/749
(58) Field of Classification Search .................. 714/748, 714/749, 751
See application file for complete search history.

(56) References Cited

U.S. PATENT DOCUMENTS

| | | | |
|---|---|---|---|
| 5,946,320 A | 8/1999 | Decker | |
| 6,654,926 B1 | 11/2003 | Raphaeli et al. | |
| 6,977,888 B1 | 12/2005 | Frenger et al. | |
| 7,002,923 B2 | 2/2006 | Golitschek et al. | |
| 7,013,143 B2 | 3/2006 | Love et al. | |
| 7,321,940 B1 | 1/2008 | Smith et al. | |
| 7,664,198 B2 * | 2/2010 | Kalhan et al. | 375/295 |
| 2002/0061080 A1 | 5/2002 | Richards et al. | |
| 2002/0089451 A1 | 7/2002 | Wang et al. | |
| 2002/0168945 A1 * | 11/2002 | Hwang et al. | 455/69 |
| 2003/0145269 A1 | 7/2003 | Kuo et al. | |
| 2003/0169741 A1 | 9/2003 | Torsner et al. | |
| 2003/0217319 A1 | 11/2003 | Tripathi et al. | |
| 2004/0037224 A1 | 2/2004 | Choi et al. | |
| 2004/0073626 A1 | 4/2004 | Major et al. | |
| 2004/0219917 A1 | 11/2004 | Love et al. | |
| 2005/0249296 A1 * | 11/2005 | Axnas et al. | 375/260 |
| 2005/0250497 A1 | 11/2005 | Ghosh et al. | |
| 2005/0251721 A1 * | 11/2005 | Ramesh et al. | 714/748 |
| 2005/0251722 A1 | 11/2005 | Terry et al. | |
| 2006/0067394 A1 | 3/2006 | Chen | |
| 2006/0200722 A1 * | 9/2006 | Braun | 714/748 |
| 2006/0251015 A1 | 11/2006 | Khan | |
| 2006/0292992 A1 * | 12/2006 | Tajima et al. | 455/67.11 |
| 2007/0104130 A1 | 5/2007 | Venkatachalam | |

(Continued)

*Primary Examiner* — Marc Duncan
(74) *Attorney, Agent, or Firm* — Birch Stewart Kolasch & Birch, LLP

(57) ABSTRACT

An automatic repeat request (ARQ) method for use in a communication system is disclosed. The ARQ method constructs a first data block set including a plurality of data blocks using data received from an upper layer, and transmits the data blocks contained in the first data block set to a reception end. If a predetermined time elapses without receiving any acknowledgement (ACK) signal after transmitting a last data block among the plurality of data blocks, the ARQ method transmits at least one data block reconstructed by the data received from the upper layer to the reception end until receiving the acknowledgment (ACK) signal from the reception end.

12 Claims, 20 Drawing Sheets

U.S. PATENT DOCUMENTS

| | | |
|---|---|---|
| 2007/0153923 A1 | 7/2007 | Pi et al. |
| 2007/0245203 A1* | 10/2007 | Cho et al. .................. 714/748 |
| 2007/0280193 A1* | 12/2007 | Kim et al. .................. 370/349 |
| 2008/0107197 A1 | 5/2008 | Jen |
| 2008/0253326 A1 | 10/2008 | Damnjanovic |
| 2008/0256410 A1* | 10/2008 | Park et al. .................. 714/748 |
| 2008/0301516 A1 | 12/2008 | Han et al. |
| 2009/0168708 A1 | 7/2009 | Kumar et al. |

* cited by examiner

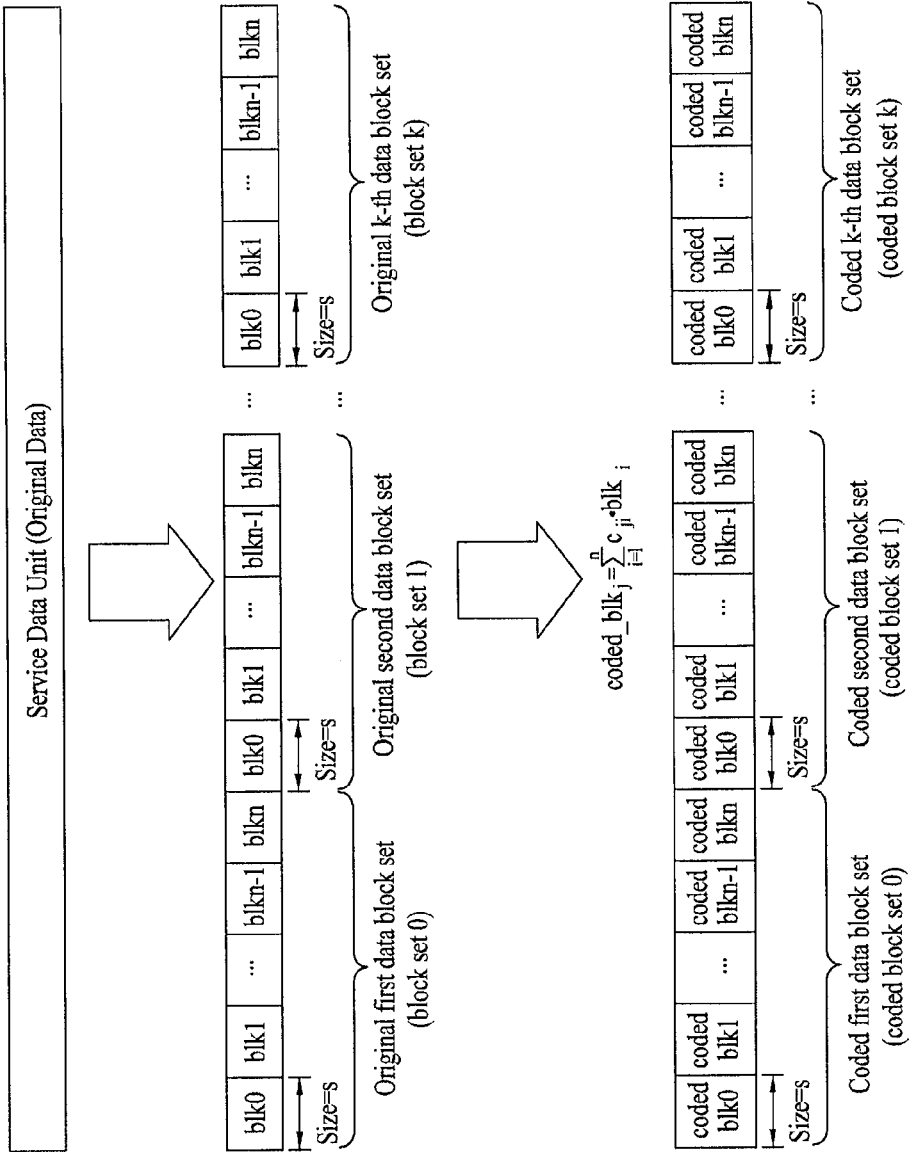

METHOD OF AUTOMATIC REPEAT REQUEST (ARQ) IN COMMUNICATION SYSTEM

This application is the National Phase of PCT/KR2008/002217 filed on Apr. 18, 2008, which claims priority under 35 U.S.C. 119(e) to U.S. Provisional Application No. 60/912,886 filed on Apr. 19, 2007 and under 35 U.S.C. 119(a) to Patent Application No. 10-2007-0044487 filed in Korea on May 8, 2007, all of which are hereby expressly incorporated by reference into the present application.

TECHNICAL FIELD

The present invention relates to a data retransmission method for use in a wireless access system.

BACKGROUND ART

A general data retransmission method will hereinafter be described in detail.

If a transmission end transmits data, a reception end receives the data from the transmission end. If a failure in data transmission occurs, the reception end requests retransmission of the corresponding data. In this case, an Automatic Repeat reQuest (ARQ) scheme has been widely used as a general data retransmission method.

According to the above-mentioned ARQ scheme, after the reception end has received the data, it transmits an acknowledgement (ACK) signal and/or a non-acknowledgement (NACK) signal, such that the reception end informs the transmission end whether data has been correctly received. If the transmission end receives the NACK signal, it retransmits corresponding data. The above-mentioned ARQ scheme has three kinds of ARQ schemes, i.e., a Stop-And-Wait (SAW) ARQ scheme, a Go-Back-N (GBN) ARQ scheme, and a Selective-Repeat (SR) ARQ scheme.

FIG. 1 is a conceptual diagram illustrating the SAW ARQ scheme.

Referring to FIG. 1, "A" is a transmission end, and "B" is a reception end. A horizontal axis indicates that a frame transmission after the lapse of time. This frame is denoted by "fr".

As shown in FIG. 1, according to the SAW ARQ scheme, the transmission end transmits data, and waits for the ACK or NACK signal. If the transmission end receives the ACK signal, it transmits the next data. Otherwise, if the transmission end receives the ACK signal, it retransmits the same data. In other words, the SAW ARQ scheme transmits only one frame at one time. After the transmission end recognizes that data has been successfully transmitted to a desired destination, it transmits the next data. The above-mentioned SAW ARQ scheme can be easily implemented. However, the transmission end is unable to transmit the next data until receiving the ACK signal associated with data transmission, resulting in low efficiency.

FIG. 2 is a conceptual diagram illustrating the GBN ARQ scheme.

The GBN ARQ scheme enables the transmission end to continuously transmit data, irrespective of a response message. Referring to FIG. 2, a data sequence of a third frame is lost while the transmission end transmits data. The transmission end has not received the ACK signal from the ACK signal of the third frame, such that it retransmits data from the third frame.

The GBN ARQ scheme must assign a sequence number to each frame, and must manage individual frames, such that its implementation may be unexpectedly complicated. Also, the GBN ARQ scheme may discard all of the correctly-received data.

FIG. 3 is a conceptual diagram illustrating the SR ARQ scheme.

The SR ARQ scheme has been designed to retransmit only specific data which has received the NACK signal. Referring to FIG. 3, the reception end has not received data of a second frame. Therefore, the reception end transmits the NACK signal to the transmission end. The transmission end which has received the NACK signal retransmits data of a frame denoted by the NACK signal to the reception end.

According to a packet-based data transmission scheme, there is needed a higher data rate. According to a high-speed data transmission environment, a new coding rate or a new modulation method is being intensively developed. Therefore, there is proposed a hybrid ARQ (HARQ) scheme suitable for a high-speed data transmission environment.

If data is faulty or erroneous data, the ARQ scheme discards this data. However, according to the HARQ scheme, the reception end stores the erroneous data in a buffer, combines the stored data with the retransmitted data, and applies a forward error correction (FEC) to the combined resultant data. In other words, the HARQ scheme is considered that the FEC scheme is combined with the ARQ scheme. In this case, the HARQ scheme can be classified into four types.

FIG. 4*a* is a first type of the HARQ scheme.

Referring to FIG. 4*a*, according to the first type of the HARQ scheme, the reception end attaches an error detection code to data, such that it primarily detects the FEC. In this case, if the packet has the remaining errors, the reception end requests data retransmission from the transmission end. The reception end discards the erroneous packet, the transmission end applies the same FEC code as that of the discarded packet to another packet to be retransmitted, and transmits the resultant packet.

FIG. 4*b* is a second type of the HARQ scheme.

This second type of the HARQ scheme may also be called an incremental redundancy (IR) ARQ scheme. Referring to FIG. 4*b*, according to the second type of the HARQ scheme, the reception end does not discard the first transmission packet, and stores it in a buffer. The reception end combines the information stored in the buffer with retransmitted redundancy bits. During the data retransmission time, the transmission end retransmits only parity bits other than data bits. The parity bits retransmitted by the transmission end are changed to others whenever data is retransmitted.

FIG. 4*c* is a third type of the HARQ scheme.

The third type of the HARQ scheme is a specific case of the second type. Each packet can be self-decodable. If the transmission end retransmits data, it configures the packet including both the erroneous part and the data part, and then retransmits the configured packet. This third type of the HARQ scheme can perform the decoding more correctly than the above-mentioned second type of the HARQ scheme, whereas it has a coding gain less than that of the second type of the HARQ scheme.

FIG. 4*d* is a fourth type of the HARQ scheme.

Referring to FIG. 4*d*, according to the fourth type of the HARQ scheme, a specific function is added to the first type of the HARQ scheme. In more detail, this specific function enables the first reception data of the reception end to be stored, and allows this stored data to be combined with retransmission data. This fourth type of the HARQ scheme is called a Metric Combining (MC) scheme or a Chase Combining (CC) scheme. The above-mentioned fourth type of the HARQ scheme is advantageous to a Signal to Interference Noise Ratio (SINR) aspect. The parity bits of retransmission data are always equal to each other.

If data may be lost or there arises erroneous Tx (transmission) data, the above-mentioned data retransmission methods can recover original data.

However, according to conventional arts, a delay of a data transfer time for each retransmission method may unexpectedly increase, such that resources of a communication network may be unnecessarily consumed. During the data transmission time, unexpected errors may frequently occur in wired or wireless data. In order to request retransmission of faulty or erroneous data, the above-mentioned conventional arts must transmit a large amount of information for the retransmission request to a destination. As a result, the reception end may not guarantee a desired-level service.

DISCLOSURE

Technical Problem

Accordingly, the present invention is directed to a data retransmission method for use in a communication system that substantially obviates one or more problems due to limitations and disadvantages of the related art.

An object of the present invention is to provide a data processing method and a data retransmission method for use in a communication system.

Another object of the present invention is to provide a method for strengthening an error recovery performance of a transmission/reception end on the condition that faulty or erroneous data has occurred in data transmission.

Another object of the present invention is to provide a method for guaranteeing reliability of data information to be transmitted, simultaneously while implementing a minimum time delay.

Another object of the present invention is to provide a data processing/retransmitting method capable of reducing an amount of system overhead on the condition that retransmission of faulty or erroneous data has been requested.

Technical Solution

To achieve these objects and other advantages and in accordance with the purpose of the invention, as embodied and broadly described herein, an automatic repeat request (ARQ) method for use in a communication system comprising: constructing a first data block set including several data blocks using data received from an upper layer; transmitting the data blocks contained in the first data block set to a reception end; and if an acknowledgment (ACK) signal is not received from the reception end until a predetermined time from a transmission time of a final data block from among the data blocks elapses, transmitting at least one data block reconstructed by the data to the reception end until receiving the acknowledgment (ACK) signal from the reception end.

Preferably, the individual data blocks contained in the first data block set are independent of each other.

Preferably, the data blocks are generated by encoding the data using a coefficient matrix, and the encoded data blocks are independent of each other.

Preferably, the predetermined time is decided by a timer of a transmission end.

Preferably, the acknowledgment (ACK) signal is transmitted in units of a data block set when all the data blocks of the data block set have been completely received.

Preferably, the predetermined time is decided by a timer of a transmission end.

Preferably, the data blocks are generated by encoding the data using a coefficient matrix, and the encoded data blocks are independent of each other.

In another aspect of the present invention, there is provided an automatic repeat request (ARQ) method for use in a communication system comprising: constructing a first data block set including several data blocks using data received from an upper layer; transmitting the data blocks contained in the first data block set to a reception end; and if a non-acknowledgement (NACK) signal is received from the reception end during the transmission of the data blocks contained in the first data block set, reconstructing a predetermined number of data blocks as many as the number of received NACK signals on the basis of the data, and transmitting the reconstructed data blocks to the reception end.

Preferably, the automatic repeat request (ARQ) method further comprises: if the reception end has normally received all the data blocks contained in the first data block set, transmitting an acknowledgment (ACK) signal to the transmission end on the basis of the data block set.

Preferably, the automatic repeat request (ARQ) method further comprises: if an acknowledgment (ACK) signal is not received from the reception end until a predetermined time from a transmission time of a final data block from among the data blocks elapses, transmitting at least one data block reconstructed by the data to the reception end until receiving the acknowledgment (ACK) signal from the reception end.

In another aspect of the present invention, there is provided an automatic repeat request (ARQ) method for use in a communication system comprising: constructing a first data block set including several data blocks using data received from an upper layer; transmitting the data blocks contained in the first data block set to a reception end; and transmitting at least one data block reconstructed by the data to the reception end, until receiving an acknowledgment (ACK) signal after transmitting a final data block from among the data blocks.

In another aspect of the present invention, there is provided an automatic repeat request (ARQ) method for use in a communication system comprising: receiving a plurality of data blocks contained in a first data block set; if data blocks as many as the number of the data blocks contained in the first data block set are received, transmitting an acknowledgment (ACK) signal in units of a data block set; and recovering original data using the received first data block set.

In another aspect of the present invention, there is provided an automatic repeat request (ARQ) method for use in a communication system comprising: generating at least one coded data block by encoding data received from an upper layer; transmitting the at least one coded data block to a reception end; if a non-acknowledgement (NACK) signal is received from the reception end, re-encoding the data, and generating at least one of other coded data blocks; and transmitting the other coded data blocks to the reception end.

In another aspect of the present invention, there is provided an automatic repeat request (ARQ) method for use in a communication system comprising: constructing a first data block set including one or more data blocks using data received from an upper layer; encoding the data blocks contained in the first data block set by generating a coefficient matrix; sequentially transmitting the encoded data blocks contained in the encoded first data block set; and if an acknowledgment (ACK) signal is not received from the reception end until a predetermined time from a transmission time of a final encoded data block from among the encoded data blocks elapses, transmitting at least one encoded data block reconstructed by the upper-layer data to the reception end until receiving the acknowledgment (ACK) signal from the reception end.

In another aspect of the present invention, there is provided an automatic repeat request (ARQ) method for use in a communication system comprising: dividing data received from an upper layer into small-sized parts, and constructing a first data block set including at least one data block; generating a coefficient matrix to encode the data blocks contained in the first data block set, and encoding the data blocks; sequentially transmitting the encoded data blocks to the reception end; and if a non-acknowledgement (NACK) signal is received from the reception end during the transmission of the encoded data blocks, reconstructing a predetermined number of data blocks as many as the number of received NACK signals on the basis of the upper-layer data, and transmitting the reconstructed data blocks to the reception end.

In another aspect of the present invention, there is provided an automatic repeat request (ARQ) method for use in a communication system comprising: dividing data received from an upper layer into small-sized parts, and constructing a first data block set including at least one data block; generating a coefficient matrix to encode the data blocks contained in the first data block set, and encoding the data blocks; sequentially transmitting the encoded data blocks to the reception end; and transmitting at least one encoded data block reconstructed by the upper-layer data to the reception end, until receiving an acknowledgment (ACK) signal after transmitting a final encoded data block from among the data blocks.

ADVANTAGEOUS EFFECTS

The present invention has the following effects.

According to the following embodiments of the present invention, a recovery performance of a data error can be further strengthened, resulting in a guarantee of transmission of more reliable data.

According to the inventive data retransmission method, the present invention minimizes an amount of unnecessary Tx information during a data-block transmission, such that it greatly reduces a time delay. As a result, it can reduce an amount of overhead of a system.

Also, the present invention prevents faulty or erroneous data from being generated in a wireless/wired section according to each data processing method, such that it guarantees reliable communication. The present invention does not generate unnecessary ACK/NACK signals according to the data retransmission method, such that the transmission end can seamlessly transmit information, resulting in reduction of a time delay of information transmission.

DESCRIPTION OF DRAWINGS

The accompanying drawings, which are included to provide a further understanding of the invention, illustrate embodiments of the invention and together with the description serve to explain the principle of the invention.

In the drawings:

FIG. 6 is a conceptual diagram illustrating a data processing method according to the present invention;

BEST MODE

Reference will now be made in detail to the preferred embodiments of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

For the convenience of description and better understanding of the present invention, general structures and devices well known in the art will be omitted or be denoted by a block diagram or a flow chart. Wherever possible, the same reference numbers will be used throughout the drawings to refer to the same or like parts.

The present invention provides a method for reliably transmitting/receiving data using a data retransmission method, and reducing a time delay caused by the data retransmission.

According to one characteristics of the present invention, the present invention is characterized in that the set of data blocks is constructed using upper-layer data, and the data blocks are encoded by the randomized linear coding method. Each data block encoded by the randomized linear coding method includes information of all data blocks contained in the set of original data blocks. Therefore, although some data blocks are lost, there is no need to retransmit the lost data blocks, the present invention receives other coded data blocks, thereby recovering data.

According to other characteristics of the present invention, the present invention combines a data processing method with a data transmission method, such that it provides an error control method and a data retransmission method which are superior to those of the conventional art.

Configuration, operations, and other characteristics of the present invention can be readily understood by the following embodiments to be described in the annexed drawings. The following embodiments can be applied to the broadband wireless access system. However, the scope or spirit of the present invention may not be limited to only some terms indicating details of the present invention, and the present invention can be applied to not only the wireless system but also the wired system.

Figure 1:
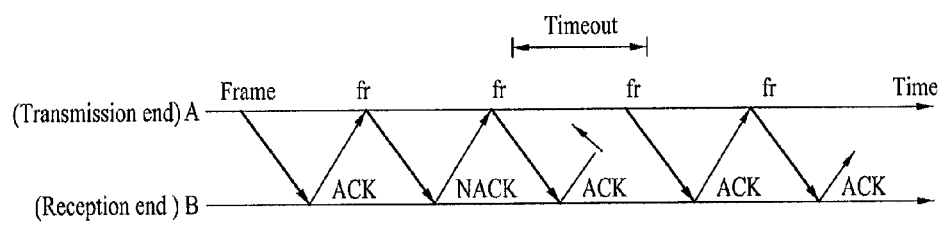
FIG. 1 is a conceptual diagram illustrating a Stop-And-Wait (SAW) ARQ scheme according to a conventional art.
Figure 2:
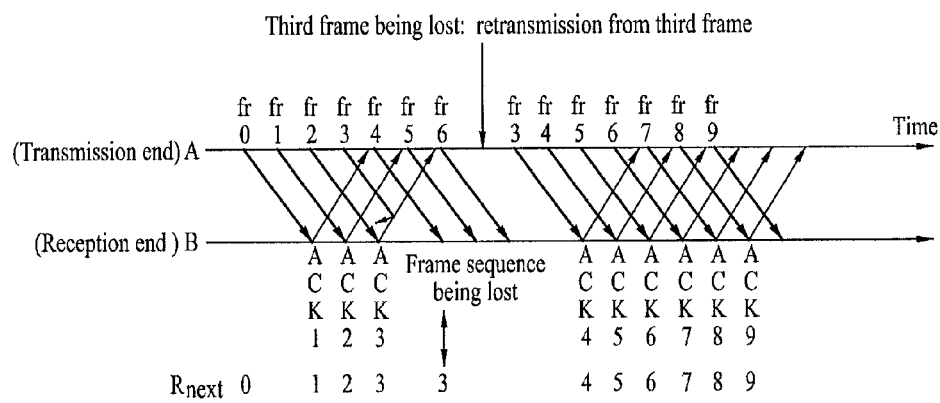
FIG. 2 is a conceptual diagram illustrating a Go-Back-N (GBN) ARQ scheme according to a conventional art.
Figure 3:
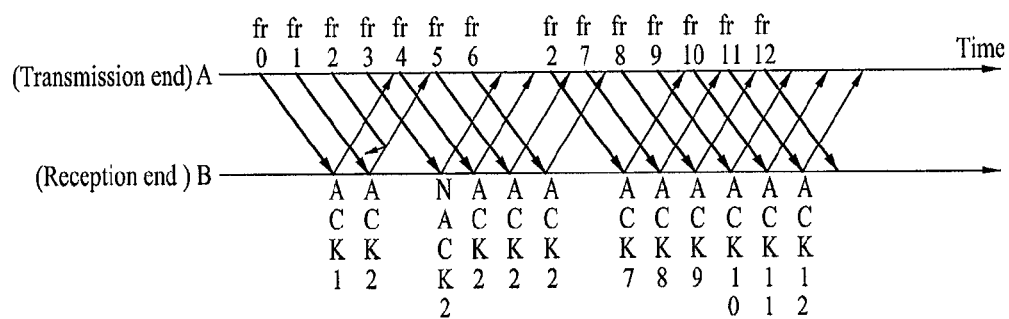
FIG. 3 is a conceptual diagram illustrating a Selective Repeat (SR) ARQ scheme according to a conventional art.
Figure 4A:
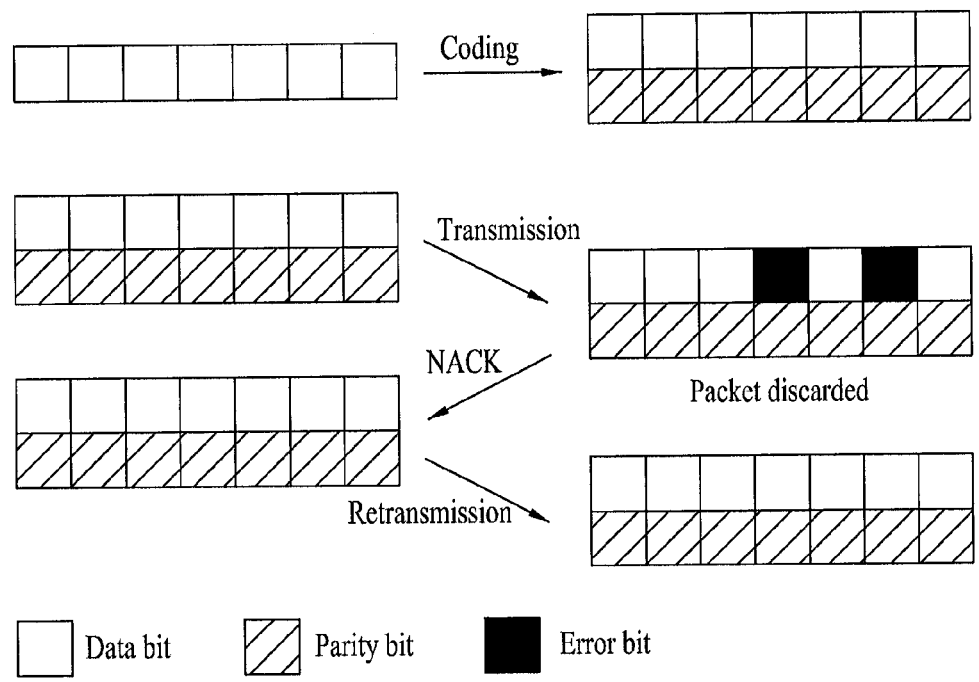
FIG. 4a is a first type of the HARQ scheme.
Figure 4B:
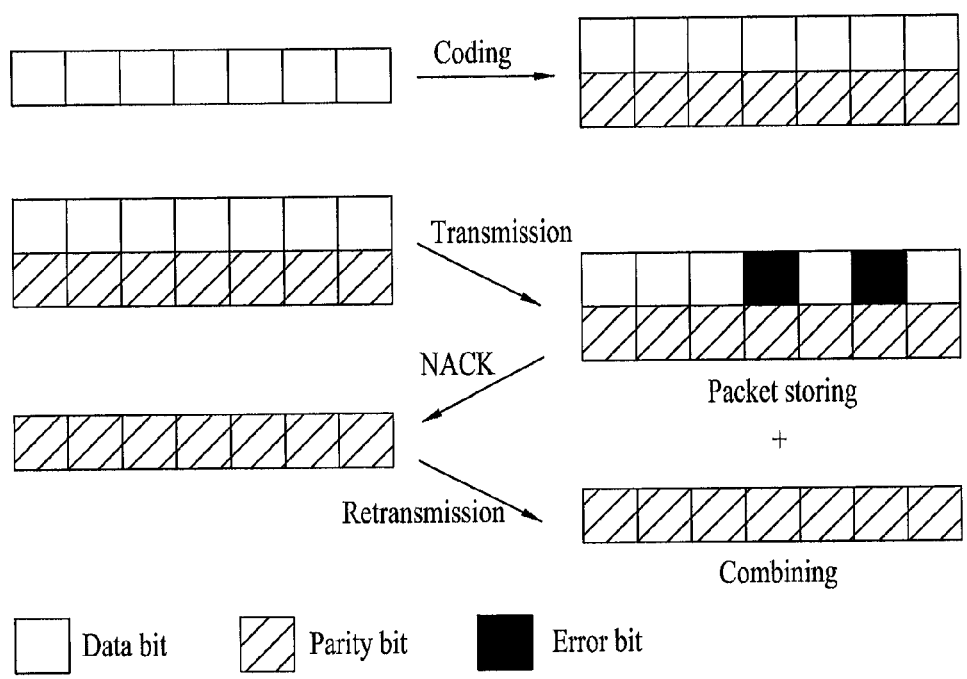
FIG. 4b is a second type of the HARQ scheme.
Figure 4C:
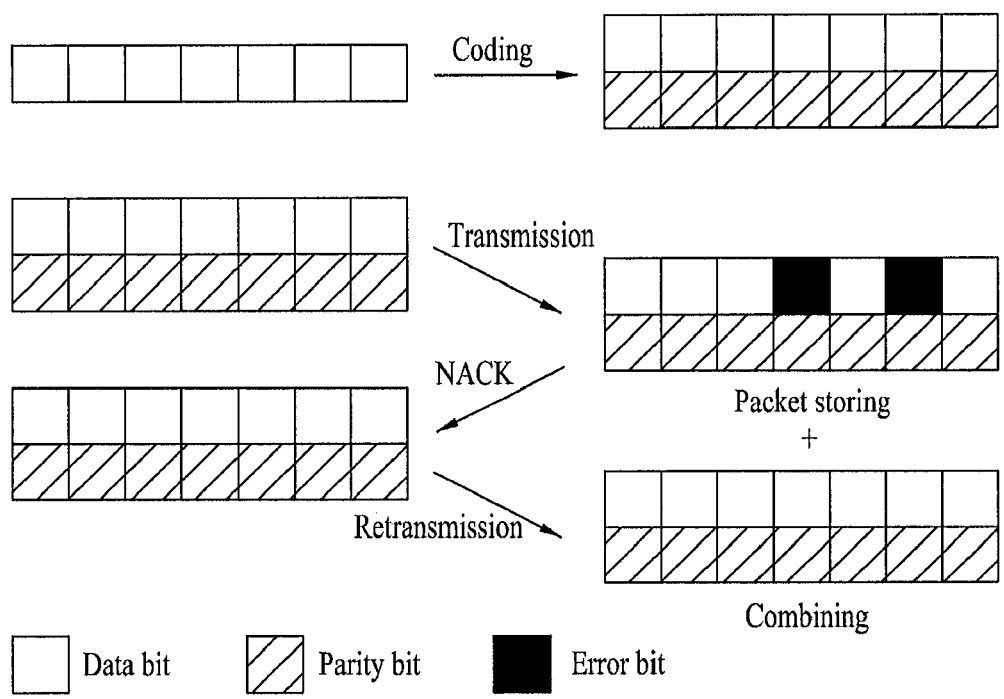
FIG. 4c is a third type of the HARQ scheme.
Figure 4D:
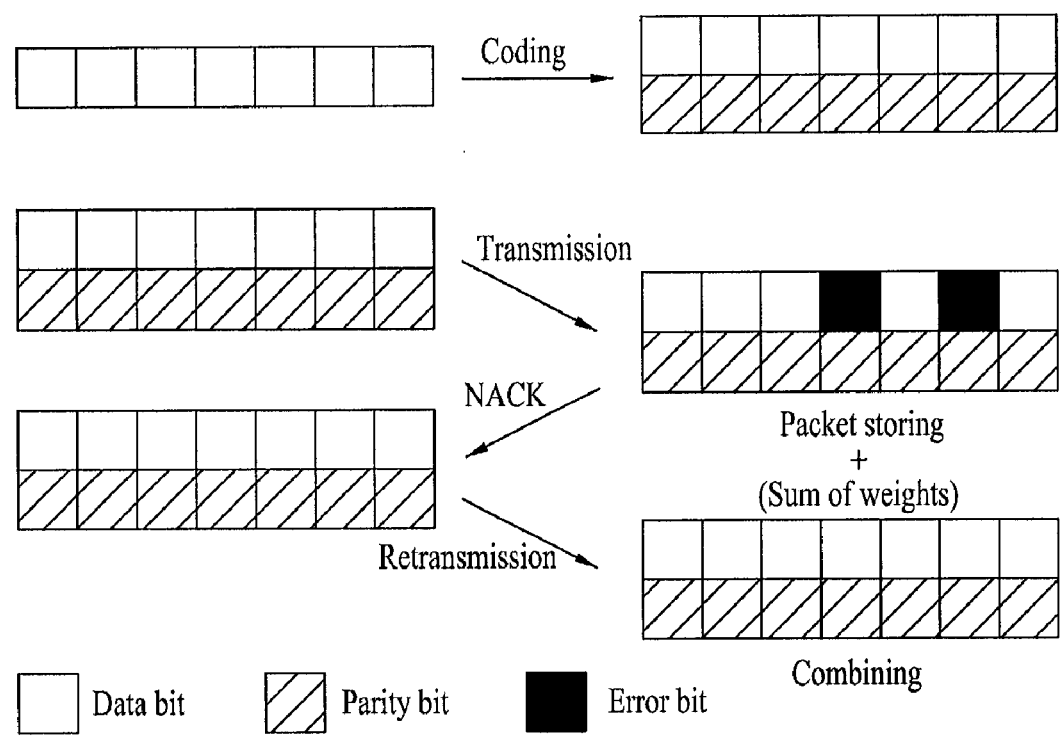
FIG. 4d is a fourth type of the HARQ scheme.
Figure 5:
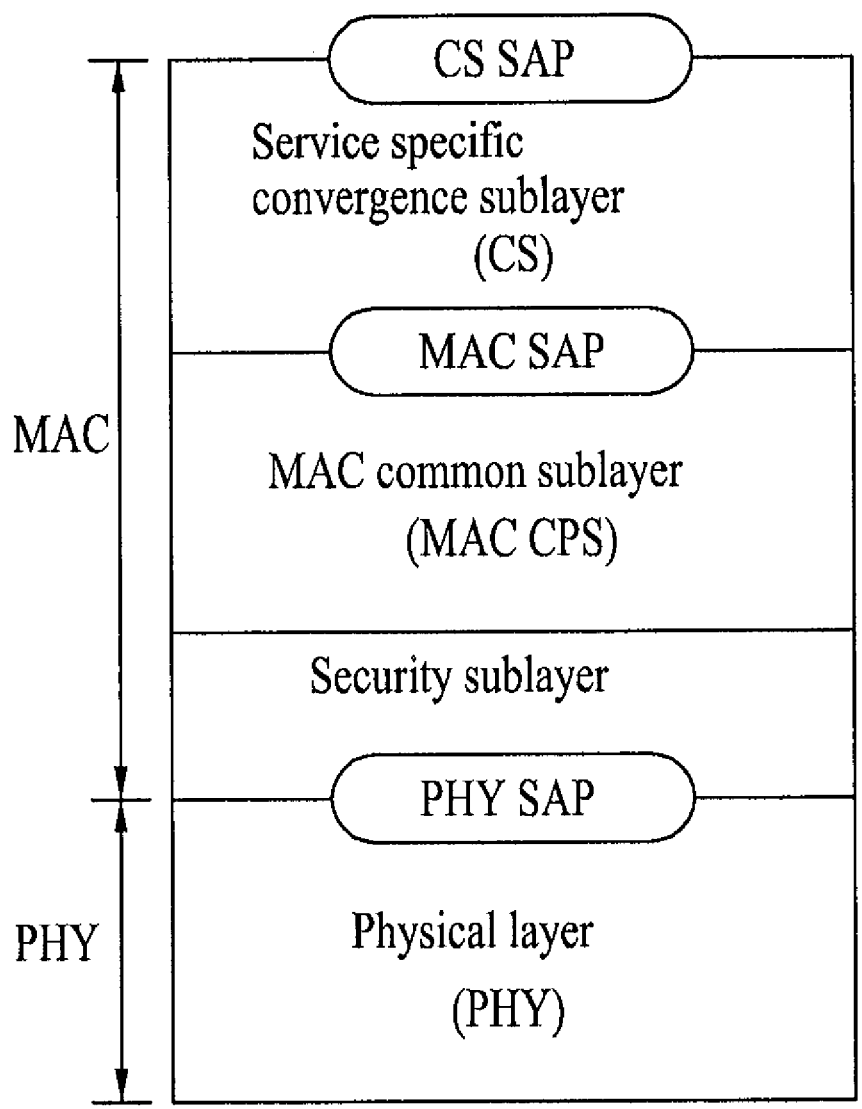
FIG. 5 is a structural diagram illustrating a protocol layer for use in the IEEE 802.16 system according to the present invention.

FIG. 5 is a structural diagram illustrating a protocol layer for use in the IEEE 802.16 system according to the present invention.

Referring to FIG. 5, an upper layer (e.g., an IP layer, ATM, and Ethernet) of the transmission end transmits Service Data Unit (SDU)—formatted data to a Medium Access Control (MAC) common point sublayer (CPS) via a convergence sublayer (CS) service access point (SAP).

The MAC CPS configures the SDU in the form of a MAC Protocol Data Unit (PDU). In this case, the SDU can be configured in the form of a PDU according to the inventive data processing method. In the MAC PDU, a security encryption is added to a privacy sublayer, and the added result is transmitted to the physical layer via the physical SAP. The physical layer performs operations required for transmitting the configured PDU to a wireless- or wired-section. In the embodiments of the present invention, a term "data block" is used to refer to a MAC PDU. However, note that other terms may also be used to refer to the term "MAC PDU" by necessity.

The physical layer of the reception end receives the MAC PDU from the transmission end via the wired or wireless section, and transmits the received MAC PDU to the MAC CPS via the PHY SAP. The above-mentioned MAC CPS recovers original information data using the inventive data processing method. The recovery data is transmitted to an upper layer via the MAC SAP. The reception end performs the ARQ operation according to the data reception status, such that it transmits the ACK or NACK signal to the transmission end.

According to the present invention, the data processing method and the data retransmission method can be used in the MAC CPS. The data processing steps (e.g., the encoding and/or the decoding of data) are performed in the MAC CPS. Also, the MAC CPS performs the ARQ process, which is a data retransmission method. In the embodiments of the present invention, some embodiments associated with the data retransmission method can also be performed in the MAC CPS.

"Header" required for processing the protocol for each layer in a protocol stack is added to data. Each protocol layer confirms information contained in the header. Although data is transmitted via different layers, it may be considered that data communication be conducted between the same layers. Therefore, although the data processing method and the data retransmission method are used in the MAC CPS of each of the transmission end and the reception end, the embodiments of the present invention will briefly explain the above-mentioned methods as the data processing methods of the transmission and reception ends.

The terms of FIG. 5 are disclosed for only illustrative purposes of the data processing method and the data retransmission method, and they can be replaced with other terms as necessary.

FIG. 6 is a conceptual diagram illustrating a data processing method according to the present invention.

According to one embodiment of the present invention, one of the data processing methods is a randomized linear coding method. A method for processing a data block using the randomized linear coding method will hereinafter be described in detail.

The randomized linear coding method is used in the data processing method of a communication system of the transmission end. The transmission end divides upper-layer data into at least one data block. The transmission end selects the number (n) of data-block sets from among the divided data blocks, and configures the data-block set using the selected number (n). In this case, the number (n) of the data-block sets may be determined by a channel environment of a communication network, performance information of the transmission/reception ends, or requirements of an application program, etc.

The transmission end generates a coefficient matrix for coding the divided data blocks. The transmission end multiplies the coefficient matrix based on a predetermined rule by the divided data blocks, or encodes the divided data blocks using other calculation methods. The above-mentioned randomized linear coding method is referred to as the above-mentioned data processing method.

According to one embodiment of the present invention, one of the data processing methods is the randomized linear coding method. A method for processing the data block using the randomized linear coding method will hereinafter be described in detail.

The randomized linear coding method may be used in the data processing method of the reception-end communication system. The reception end sequentially receives the encoded data blocks from the transmission end. Also, the randomized linear coding method receives the coefficient matrix required for decoding from the transmission end. The reception end may decode the data block using the randomized-linear-coded data block and an inverse matrix of the coefficient matrix. Also, the reception end can perform the decoding process using other calculation methods. The randomized linear coding method is indicative of the above-mentioned data processing method.

The coefficient matrix for use in the randomized linear coding method and the randomized linear decoding method may be generated by a predetermined-ranged random number determined by either the transmission end or the transmission/reception ends. In this case, the random number is a specific number within a predetermined range (e.g., 0~255) decided by an agreement of the transmission/reception ends, and is extracted from several numbers of the predetermined range at random.

Also, the coefficient matrix may be created by a seed value required for generating coefficients. The following Table 1 shows an example for generating the coefficient matrix using the seed value.

TABLE 1

| Syntax | Contents |
---|---
| const int m = (2 << 30) − 1;<br>    const int a = 16807;<br>    const int q = m / a;<br>    const int r = m % a;<br>        double Random::rand(void)<br>        {<br>            double z;<br>                seed = a * (seed % q) − r * (seed / q);<br>            if (seed <= 0)<br>            seed = seed + m;<br>            z = (seed * 1.0) / m;<br>            return z;<br>    }<br>    void Random::initialize(void)<br>    {<br>        Timestamp c;<br>        c.setnow( );<br>        seed = (int) c.getUsecs( );<br>    } | |

With reference to Table 1, the coefficient matrix may be generated by a random number. In the randomized linear coding, a seed value is extracted as a current time value such that the random number can be generated in Table 1, and the rand function (rand(void)) is generated on the basis of the seed value. The transmission end may create the coefficient matrix using the final value generated by the above-mentioned rand function (rand(void)).

The reception end may perform the randomized linear coding using the inverse matrix of the coefficient matrix. Provided that the reception end pre-recognizes the seed value, it may calculate the final value using the above-mentioned rand function. The reception end may generate the coefficient matrix having been used in the coding using the above-mentioned final value, and may perform the decoding using the coefficient matrix. Therefore, although the reception end does not know an overall coefficient matrix value, the reception end can recover original data on the condition that the reception end recognizes the seed value.

The randomized linear coding method and the randomized linear decoding method may be considered to be only exemplary terms defined by the data processing method of the present invention, and the terms indicating the above-mentioned methods may be modified in various ways.

The randomized linear coding method and the randomized linear decoding method will hereinafter be described with reference to FIG. 6.

A service data unit (SDU) received from an upper layer is divided into one or more protocol data units (PDUs).

The above-mentioned protocol data units (PDUs) are hereinafter referred to as an original data block "blk". The transmission end divides the SDU received from the upper layer into s-sized data blocks. N data blocks are selected from among the s-sized data blocks, such that the data-block set is configured. In this embodiment of the present invention, the selected data blocks are called an original data block set. In this case, the randomized-linear-coded data block in the transmission end may be called the coded data block. If N coded data blocks are collected, the collected data blocks may be called the encoded data block set. However, the terms of FIG. 6 have been disclosed for only illustrative purposes, and can also be called other terms as necessary.

The data processing/analyzing methods based on the randomized linear coding/decoding methods according to the present invention employ a finite-field calculation method instead of the mathematical calculation method. However, according to one embodiment of the present invention, other calculation methods may be used within the range of rational analysis.

Provided that a commutative ring has a unit circle for the multiplication and enables each element other than "0" to have an inverse element for the multiplication, this commutative ring is called a field. Specifically, if the number of elements is finite, the above-mentioned field is considered to be a finite field. This finite field is called a Galois field. The Galois field has the size of $P^m$, and the size of $P^m$ may also be denoted by $GF(P^m)$.

The calculation method for the above-mentioned Galois field will hereinafter be described in detail.

Addition and subtraction of the finite field will hereinafter be described using $GF(2^8)$ as an example. The scope or spirit of the present invention is not limited to only the value of $GF(2^8)$, and a variety of Galois fields can be used in various ways. The addition and multiplication of the finite field are equal to an exclusive-OR (XOR). The bit-to-bit addition and the bit-to-bit subtraction are equal to XOR operation of bits.

The brief representation of the XOR operation may be denoted by "1+1=0" and "1+0=1". The primitive polynomial is decided. For example, "$m(x)=x^8+x^4+x^3+x^2+1=0x11d$ (hex)" may be used as the primitive polynomial. However, the above-mentioned polynomial is an embodiment of the present invention, such that another polynomial is defined as a primitive polynomial.

The multiplication is the product of polynomials indicating two numbers, and a predetermined polynomial having the order of 14 may be created. However, the product of the polynomials does not exceed the order of the finite field, two polynomials are multiplied, and the multiplied result is divided by a primitive polynomial, such that the order is lowered. Namely, the multiplication value or the product value must not exceed a maximum order of the finite field.

An exemplary method for multiplying "183" by "83" will hereinafter be described. If "183" is denoted by the polynomial in the finite field, the result is $x^7+x^5+x^4+x^2+1$. If "83" is denoted by the polynomial in the finite field, the result is $x^6+x^4+x^1+1$. If the two polynomials are multiplied, the result is $x^{13}+x^{10}+x^9+x^8+x^5+x^4+x^3+x^1$. Therefore, if the above-mentioned resultant value is divided by the primitive polynomial, the remainder may act as the final resultant value. In this case, if the final resultant value is represented by a decimal number, the result is "238".

Based on the above-mentioned calculation method, the coding method and the decoding method, which are capable of being used in the embodiments of the present invention, will hereinafter be described in detail.

The randomized linear coded data block set ($\overline{E}$) configured by the original data block ($\overline{S}$) can be represented by the following equation 1:

$$\overline{E} = \overline{H} \times \overline{S} \quad \text{[Equation 1]}$$

In Equation 1, the matrix ($\overline{H}$) is called a coefficient matrix. Equation 1 shows a method for combining the original data block set. There may be a variety of methods for generating the coefficient matrix. Firstly, the coefficient matrix size is defined by n×n according to the number (n) of data blocks of the above-mentioned data block set.

The transmission end configures a coefficient as a random number to generate the coefficient matrix. In other words, the transmission/reception ends determine the numbers of a predetermined range (e.g., 0~255) according to their agreement, such that they select any number from among the above-mentioned numbers at random. As another method, the transmission end and the reception end may share a seed value required for generating the random number. In other words, if the reception end pre-recognizes the seed value, the coefficient matrix generated by the transmission end may be re-generated.

For example, the transmission end may generate the above-mentioned coefficient matrix using the seed value and the rand function shown in Table 1. The reception end may decode data using the inverse matrix of the coefficient matrix.

For another method, according to the IEEE 802.16 system, a connection ID contained in the MAC header is combined with a short seed, such that the combined result is used as the resultant seed and the coefficient matrix can be generated.

If the transmission end generates the coefficient matrix, n×n matrices may be generated at one time. However, the transmission end makes N number of 1×n matrices independent of each other, and constructs the n×n matrices. Therefore, a single row of the coefficient matrix for each coded data block is used.

As one of the data processing methods, a detailed embodiment of the randomized linear coding method will hereinafter be described in detail.

For example, if the original data block size is 100 bytes and "n" is set to "5", the coefficient matrix size may be 5×5.

Also, according to one embodiment of the present invention, the transmission end extracts the numbers of the predetermined range (e.g., 0~255) at random, such that the extracted result is represented by the following coefficient matrix:

$$H = \begin{pmatrix} 1 & 2 & 2 & 3 & 1 \\ 2 & 1 & 0 & 2 & 3 \\ 3 & 1 & 0 & 2 & 1 \\ 4 & 1 & 0 & 3 & 2 \\ 5 & 1 & 0 & 4 & 3 \end{pmatrix}$$

The coefficient matrix is combined with the original data block set ($\overline{S}$) using Equation 1, such that the coded data block set ($\overline{E}$) can be represented by the following expression:

$$\overline{E} = \begin{pmatrix} E_1 \\ E_2 \\ E_3 \\ E_4 \\ E_5 \end{pmatrix} \quad \text{[Expression]}$$

$$= \overline{H} \times \overline{S}$$

$$= \begin{pmatrix} H_{11} & H_{12} & H_{13} & H_{14} & H_{15} \\ H_{21} & H_{22} & H_{23} & H_{24} & H_{25} \\ H_{31} & H_{32} & H_{33} & H_{34} & H_{35} \\ H_{41} & H_{42} & H_{43} & H_{44} & H_{45} \\ H_{51} & H_{52} & H_{53} & H_{54} & H_{55} \end{pmatrix} \times \begin{pmatrix} S_1 \\ S_2 \\ S_3 \\ S_4 \\ S_5 \end{pmatrix}$$

$$= \begin{pmatrix} 1 & 2 & 2 & 3 & 1 \\ 2 & 1 & 0 & 2 & 3 \\ 3 & 1 & 0 & 2 & 1 \\ 4 & 1 & 0 & 3 & 2 \\ 5 & 1 & 0 & 4 & 3 \end{pmatrix} \times \begin{pmatrix} S_1 \\ S_2 \\ S_3 \\ S_4 \\ S_5 \end{pmatrix}$$

$$= \begin{pmatrix} 1 \times S1 + 2 \times S2 + 2 \times S3 + 3 \times S4 + 1 \times S5 \\ 2 \times S1 + 1 \times S2 + 0 \times S3 + 2 \times S4 + 3 \times S5 \\ 3 \times S1 + 1 \times S2 + 0 \times S3 + 2 \times S4 + 1 \times S5 \\ 4 \times S1 + 1 \times S2 + 0 \times S3 + 3 \times S4 + 2 \times S5 \\ 5 \times S1 + 1 \times S2 + 0 \times S3 + 4 \times S4 + 3 \times S5 \end{pmatrix}$$

The randomized linear-coded data block includes information of all the original data blocks contained in the original data block set. In other words, the transmission end may perform the randomized linear coding by applying the coefficient matrix to the original data block. The transmission end multiplies a first row ($E_1$) of the coefficient matrix by all data blocks of the original data block set, such that it forms a first row of the matrix of the coded data block set ($\overline{E}$). Also, the transmission end multiplies a second row of the coefficient matrix by all data blocks of the original data block set, such that it forms a second row ($E_2$) of the $\overline{E}$ matrix. In this way, the transmission end can configure the coded data block set.

In this embodiment of the present invention, $GF(2^8=256)$ has been used as an example, such that each data block may be calculated in byte units.

Provided that a first value of a specific value S1 has an ASCII value of 80, a first value of a specific value S2 has an ASCII value of 81, a first value of a specific value S3 has an ASCII value of 82, a first value of a specific value S4 has an ASCII value of 83, and a first value of a specific value S5 is an ASCII value of 84, the value of a first row (E1) of the coded matrix is represented by the following expression:

$$E1 = 80 \times 1 + 81 \times 2 + 82 \times 2 + 83 \times 3 + 84 \times 1 = 80 + 162 + 164 + 245 + 84 = 247 \quad \text{[Expression]}$$

Also, although the S1 value can be denoted by the ASCII value, it can also be denoted by a vector value. For example, S1, S2, S3, S4, or S5 may also be calculated by a binary vector value. In the IEEE 802.16 system, data blocks (S1 or E1) are calculated within the size of 1 byte. But, other conversions may be applied to those skilled in the art in various ways.

A method for encoding the above-mentioned data block can be generalized by the following equation 2:

$$\text{coded\_blk}_j = \sum_{i=1}^{n} c_{ji} \cdot blk_i \quad \text{[Equation 2]}$$

In Equation 2, coded_blk$_j$ is a generalized equation of the coded data block, and $C_{ji}$ is a generalized equation of the coefficient matrix. blk$_i$ is an original data block. The randomized linear coding method can be represented by the above-mentioned generalized equations.

In this way, the coded matrix may be formed by multiplying the coefficient matrix by an original data matrix. In this case, each coded data block includes all of the original data block information. Therefore, although the coded data block is lost or has errors, the reception end may receive other coded data blocks and can recover the original data using the received data block.

As one of the data processing methods, a detailed example of the randomized linear decoding method will hereinafter be described in detail.

In order to apply the randomized linear decoding method to the reception end, the reception end must receive N number of coded data blocks (e.g., 5 data blocks) of the original data block, such that it can recover the original data. The decoding process is not affected by the receiving order of the coded data blocks. However, the decoding process is affected by the number of received coded data blocks.

For example, although data blocks contained in a first data block are received in the order of blk2, blk0, and blk1 when the reception end receives the data blocks contained in the encoded first data block set, there is no problem in data recovery. Provided that the number (n) of data blocks is limited to "5", the reception end must receive 5 coded data blocks to recover original data. Therefore, in order to decode the first data block set, the reception end must receive the data blocks (blk3 and blk4) contained in the encoded first data block set.

In the following embodiments, a data retransmission method for a first case in which the above data blocks are lost, or a data retransmission method for a second case in which the data blocks have errors will hereinafter be described in detail.

As an exemplary data retransmission method, the transmission end performs the randomized linear coding on Rx data received from the upper layer, such that it generates at least one coded data block. If the transmission end receives the NACK signal from the reception end, it re-performs the randomized linear decoding on original data, such that it generates one or more other coded data blocks. The transmission end transmits the other coded data blocks to the reception end.

In order to decode the coded data block in the reception end, the reception end requires the coefficient matrix required for encoding the data block. The reception end can decode Rx coded data using the coefficient matrix. A method for allowing the transmission end to transmit the coefficient matrix will hereinafter be described in detail.

Figure 7A:
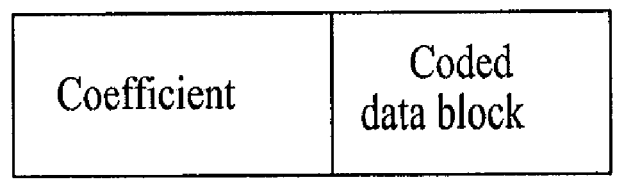
FIG. 7a is a conceptual diagram illustrating a method for transmitting a coefficient matrix according to the present invention.

FIG. 7a is a conceptual diagram illustrating a method for transmitting a coefficient matrix according to the present invention.

There may be a variety of methods for transmitting the coefficient matrix. According to one of the above methods, each coefficient value of the matrix is added to the encoded data block header, such that the added result can be transmitted. The reception end can quickly reconstruct the coefficient matrix using the coefficient matrix contained in the header. An example for including the coefficient matrix in the data block header is shown in FIG. 7a.

Figure 7B:
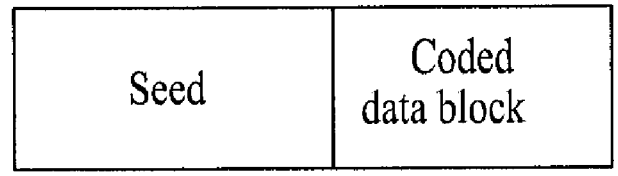
FIG. 7b is a conceptual diagram illustrating another method for transmitting a coefficient matrix according to the present invention.

FIG. 7b is a conceptual diagram illustrating another method for transmitting a coefficient matrix according to the present invention.

Referring to FIG. 7b, the transmission end contains a seed required for constructing the coefficient matrix in the encoded data block, such that it can transmit the resultant data block to the reception end. The reception end can reconstruct the coefficient matrix using the above-mentioned seed.

The transmission end transmits the coded data block set to the reception end over a communication channel. The reception end may use the following equation 3 to decode the encoded data block:

$$\overline{S} = \overline{H}^{-1} \times \overline{E} \quad \text{[Equation 3]}$$

If the reception end receives the coded data blocks as many as the number (n) of predetermined data block sets, it can recover the original data block using Equation 3. $\overline{H}^{-1}$ is an inverse matrix of the coefficient matrix, or is an inverse matrix of another coefficient matrix reconstructed by the seed value. The reception end does not calculate the inverse matrix $\overline{H}^{-1}$ to acquire the original data block $\overline{S}$, and may acquire the original data block $\overline{S}$ using the Gaussian Elimination method.

During the transmission time of the encoded data blocks, the encoded data blocks may be deteriorated or lost due to various reasons (e.g., channel environments). In this case, the reception end transmits a transmission (Tx) request of other encoded data blocks to the transmission end, and receives the encoded data blocks required for decoding the original data block. If the reception end receives several data blocks as many as the number of data blocks or other data blocks as many as the number (e.g., N) indicated in Rx data blocks, original data can be recovered. In this case, the Rx data block has been received during the communication, and the reception end has negotiated the number of data blocks with the transmission end at a communication start time or before the communication start time.

The randomized linear coding method and the randomized linear decoding method for use in the embodiments of the present invention will hereinafter be described in detail.

The transmission end transmits content data "HELLOWORLD" to the reception end. The transmission end may configure the original data block set ($\overline{S}$) the coefficient matrix ($\overline{H}$), and the number (n) of data blocks in the form of the following expression:

$$S1 = \text{"HELLO"} \quad \text{[Expression]}$$
$$S2 = \text{"WORLD"}$$
$$n = 2$$
$$\overline{H} = \begin{pmatrix} 31 & 5 \\ 6 & 1 \end{pmatrix}$$

In this case, individual letters contained in the data block can be represented by the following ASCII values:

$$S1 = 72, 69, 76, 76, 79$$

$$S2 = 87, 79, 82, 76, 68$$

The coded data block set constructed by the original data block set is shown in the following expression:

$$\overline{E} = \begin{pmatrix} E_1 \\ E_2 \end{pmatrix} \quad \text{[Expression]}$$
$$= \overline{H} \times \overline{S}$$
$$= \begin{pmatrix} H_{11} & H_{12} \\ H_{21} & H_{22} \end{pmatrix} \times \begin{pmatrix} S_1 \\ S_2 \end{pmatrix}$$
$$= \begin{pmatrix} 31 & 5 \\ 6 & 1 \end{pmatrix} \times \begin{pmatrix} S_1 \\ S_2 \end{pmatrix}$$
$$= \begin{pmatrix} 31 \times S1 + 5 \times S2 \\ 6 \times S1 + 1 \times S2 \end{pmatrix}$$

$$E_1 = (31 \times 72 + 5 \times 87, 31 \times 69 + 5 \times 79, 31 \times 76 + 5 \times 82,$$
$$31 \times 76 + 5 \times 76, 31 \times 79 + 5 \times 68)$$
$$= (125, 158, 16, 118, 127)$$

-continued $$E_2 = (6 \times 72 + 1 \times 87, 6 \times 69 + 1 \times 79, 6 \times 76 + 1 \times 82,$$
$$6 \times 76 + 1 \times 76, 6 \times 79 + 1 \times 68)$$
$$= (250, 204, 231, 249, 251)$$

Data blocks E1 and E2 contained in the coded data block set (E) are implemented by combination of the original data blocks S1 and S2. Therefore, each coded data block includes all of the original data block information.

If the reception end receives the coded data block set and decodes the original data block using the received data block set, associated operations can be represented by the following expression:

$$\overline{S} = \begin{pmatrix} S_1 \\ S_2 \end{pmatrix}$$ [Expression]

$$= \overline{H}^{-1} \times \overline{E}$$

$$= \begin{pmatrix} H_{11} & H_{12} \\ H_{21} & H_{22} \end{pmatrix}^{-1} \times \begin{pmatrix} E_1 \\ E_2 \end{pmatrix}$$

$$= \begin{pmatrix} 1 & 5 \\ 6 & 31 \end{pmatrix} \times \begin{pmatrix} 125 & 158 & 6 & 118 & 127 \\ 250 & 204 & 231 & 249 & 251 \end{pmatrix}$$

$$S_1 = (1 \times 125 + 5 \times 250, 1 \times 158 + 5 \times 204,$$
$$1 \times 16 + 5 \times 231, 1 \times 118 + 5 \times 249, 1 \times 127 + 5 \times 251)$$
$$= (72, 69, 76, 76, 79)$$

$$S_2 = (6 \times 125 + 31 \times 250, 6 \times 158 + 31 \times 204,$$
$$6 \times 16 + 31 \times 231, 6 \times 118 + 31 \times 249,$$
$$6 \times 127 + 31 \times 251)$$
$$= (87, 79, 82, 76, 68)$$

That is, the reception end can recover the original data block set (S) using the above-mentioned Equation 3. Therefore, the reception end can determine whether recovery information is equal to Tx information desired by the transmission end. The above-mentioned randomized linear coding method and the above-mentioned randomized linear decoding method can be calculated by the finite field (e.g., Galois field).

Figure 8A:
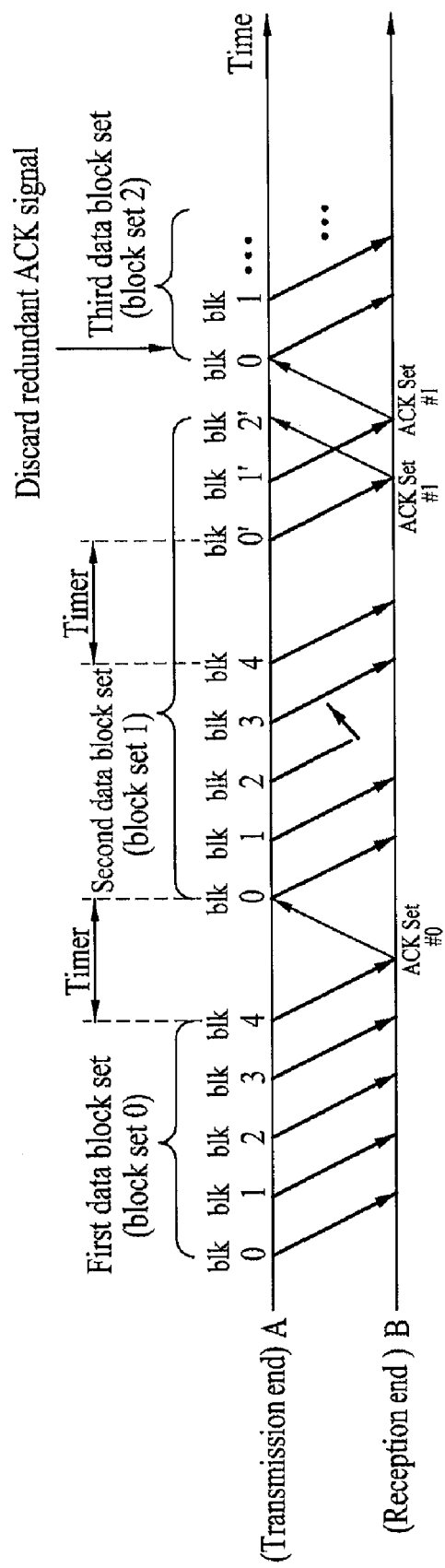
FIG. 8a is a conceptual diagram illustrating a data retransmission method according to one embodiment of the present invention.

FIG. 8a is a conceptual diagram illustrating a data retransmission method according to one embodiment of the present invention.

In FIG. 8a, the transmission end divides SDU data received from the upper layer into one or more data blocks, and selects N data blocks from among the total data blocks, such that it constructs the original data block set. The transmission end performs the randomized linear coding process on the original data block set, such that it transmits the result to the reception end.

In this case, the number (n) of data blocks indicates how many data blocks are contained in a single data block set. If the number (n) of data blocks is set to 5, FIG. 8a shows basic operations of the data retransmission method and the error recovery method.

Referring to FIG. 8a, "A" is a transmission end, "B" is a reception end, and a horizontal axis indicates data-block transmission after the lapse of time. If "N" is set to 5, the transmission end (A) configures five randomized linear coding data blocks (hereinafter referred to as five randomized linear coding blks) in the form of a single encoded data block set. The reception end (B) receives 5 encoded data blocks irrespective of the Rx order of data blocks, the original data (SDU) can be recovered.

The transmission end (A) sequentially transmits the first data block set (e.g., block set 0) to the reception end (B). If the reception end receives data blocks (blks 0~4), the original data block set can be recovered. If the reception end receives all of data blocks contained in the first data block set, it transmits an ACK signal to the transmission end in units of a data block set.

The reception end can determine the presence or absence of an error in the data block whenever each data block is received or after all the data block sets have been received. The reception end determines the presence or absence of an error by referring to an error detection code such as a cyclic redundancy check (CRC). It is well known in the art that other error control methods instead of the CRC detection method may be used for the present invention.

In FIG. 8a, the reception end does not transmit a NACK signal even when original data is not recovered. However, the reception end continuously receives the encoded data blocks as many as the number of faulty or erroneous blocks.

In other words, the reception end does not transmit the NACK signal, and receives the new encoded data blocks as many as the faulty encoded data blocks, such that it recovers original data. Therefore, the reception end transmits the ACK signal to the transmission end in units of a data block set. If the original data cannot be recovered due to the occurrence of errors, a corresponding data block set is deleted. Therefore, transmission of a NACK signal and the transmission process of a next data block can be omitted, and the delay time and an amount of overhead can be reduced during the transmission time of data.

In this case, after the transmission end transmits the final data block (blk 4), it drives a timer, and waits for reception of the ACK signal. If the timer normally receives the ACK signal within a predetermined period, the transmission end transmits the coded data block contained in the encoded second data block set (e.g., block set 1). The predetermined period established by the timer may be decided by the timer of the transmission end.

In FIG. 8a, if the transmission end transmits the encoded second data block set (i.e., block set 1), the reception end does not normally receive the encoded data block 2 (i.e., blk2). Therefore, the reception end does not recover original data although it has received the encoded data block 4 (i.e., blk4), it does not transmit the ACK signal to the transmission end.

The transmission end does not receive the ACK signal within the predetermined timer section, such that it determines that the reception end has abnormally received data. Therefore, the transmission end contains the re-coded data blocks (blk0', blk1', and blk2') in the coded second data block set (i.e., block set 1) using upper-layer data. The transmission end transmits the re-coded data blocks to the reception end until receiving the ACK signal. If the upper-layer data block is re-coded into one or more coded data blocks according to the flow of FIG. 6, the above-mentioned coded data blocks are made. The re-coded data blocks may include information of data blocks contained in the original data block set.

Therefore, if the reception end receives the next data block (blk0'), it can recover original data. The reception end successfully recovers data, and transmits the ACK signal to the transmission end in units of a data block set. In this case, the transmission end transmits the data block (blk1') to the reception end due to propagation delay caused by reception of the ACK signal. If the reception end receives the data block (blk1'), it transmits the ACK signal of the re-coded second data block set (i.e., block set 1).

Since the transmission end receives the ACK signal, it discards the data block (blk2'), and configures the coded third data block set (i.e., block set 2). Also, if the transmission end has received the retransmission ACK signal for the second data block set (i.e., block set 1), it ignores or discards this ACK signal. In FIG. 8a, the reception end (B) need not know the Rx coded data block number, and needs to calculate the number of data blocks required for recovering original data.

Figure 8B:
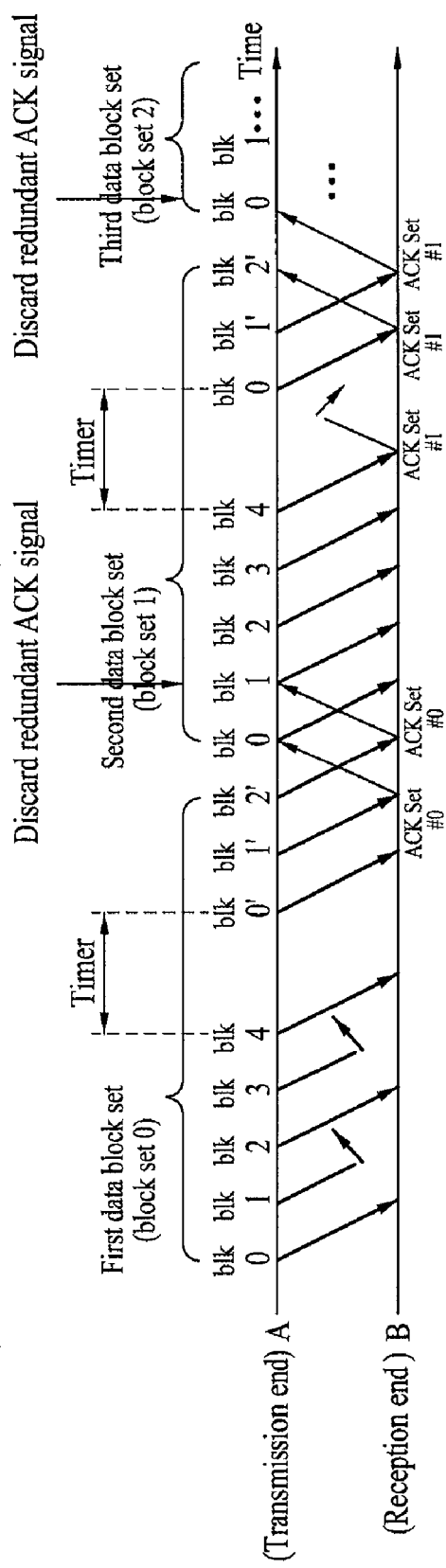
FIG. 8b is a conceptual diagram illustrating a method for recovering continuous errors of the data retransmission method and erroneous ACK signals according to the present invention.

FIG. 8b is a conceptual diagram illustrating a method for recovering continuous errors of the data retransmission method and erroneous ACK signals according to the present invention.

Referring to FIG. 8b, a specific part indicating a transmission process of the coded first data block set (i.e., block set 0) is similar to that of FIG. 8a. In other words, the transmission end configures the coded data block set, and sequentially transmits the coded data blocks. If the reception end receives coded data blocks as many as the number of blocks contained in the coded data block set, it can recover the original data block set.

As shown in FIG. 8b, two coded data blocks (blk1 and blk3) are lost, such that the reception end must further receive two coded data blocks (e.g., blk0' and blk1') to recover original data. If the reception end receives the data blocks (i.e., blk0' and blk1'), it can recover original data. In this case, the reception end transmits the ACK signal in units of a data block set. The transmission end transmits the data block (i.e., blk2') before transmitting the ACK signal, and the reception end re-transmits the ACK signal for the data block (i.e., blk2') to the transmission end.

However, the ACK signal transmitted from the reception end on the condition that the reception end has received the data block (blk2') is different from that of the data block set unit. If the reception end receives the data block (blk2'), it is determined that the original data block set has already been recovered. Therefore, the ACK signal retransmitted from the reception end is a redundant message. Namely, the reception end indicates that original data has been successfully recovered.

In this case, after the transmission end receives the ACK signal as the data block set unit, it configures the second data block set and transmits it to the reception end. The transmission end discards the ACK signal which has been retransmitted as the redundant message.

In FIG. 8b, the reception end receives all data of the second data block set (block set 1), and successfully recovers original data. Therefore, although the reception end normally transmits the ACK signal, the ACK signal may be damaged or lost during the transmission time of the ACK signal.

The transmission end does not receive the ACK signal during the timer-setup time, such that it determines that the reception end has abnormally received data. The transmission end configures the re-coded data blocks (blk0', blk1', and blk2'), and retransmits them to the reception end until receiving the ACK signal.

If the reception end receives the data block (blk0'), it can recognize a data block equal to the recovered original data although the data block has been reconstructed.

Therefore, the reception end re-transmits the ACK signal for the second data block set to the transmission end. Also, if the reception end receives the data block (blk1'), it retransmits the ACK signal to the transmission end. Since the ACK signal is a retransmitted redundant ACK signal, the transmission end discards this ACK signal, configures the next data block set, and transmits the resultant data blocks.

Figure 8C:
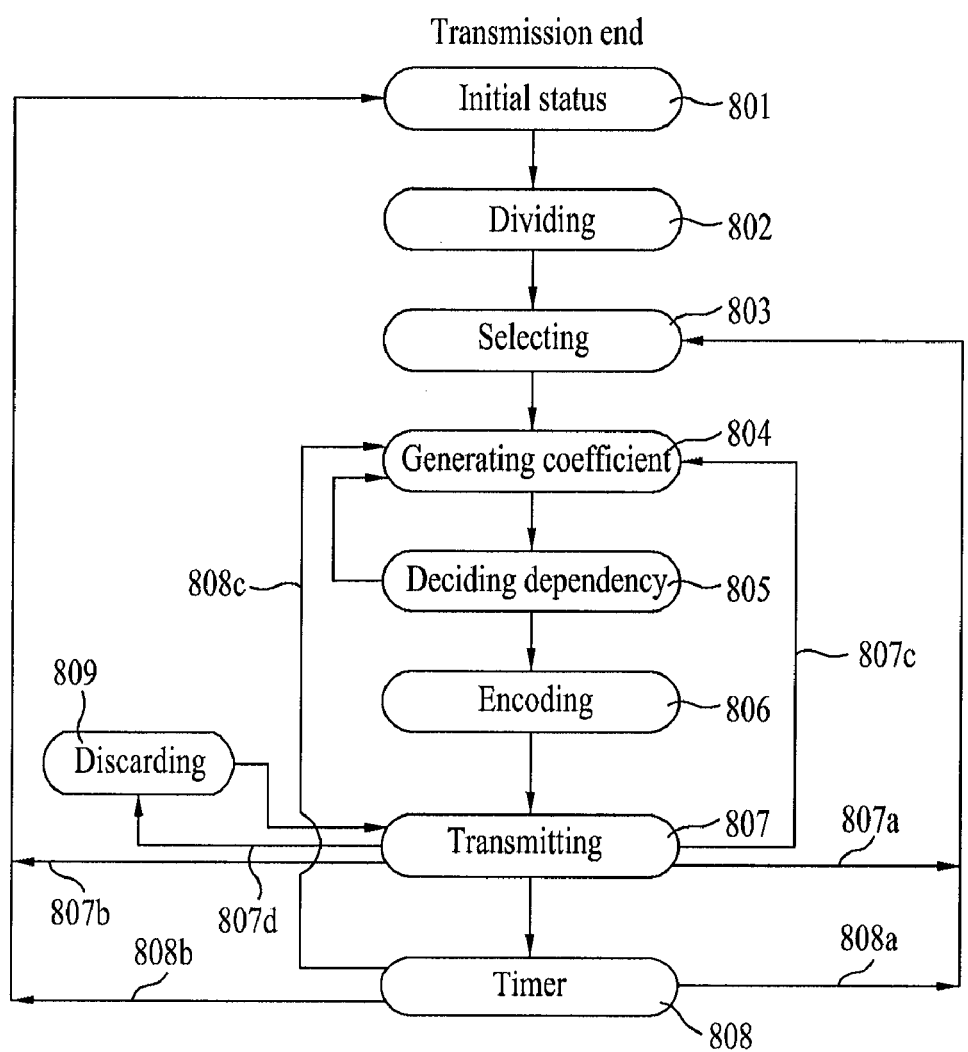
FIG. 8c is a conceptual diagram illustrating a data retransmission method of a transmission end using a randomized linear coding method serving as a representative data-block processing method according to the present invention.

FIG. 8c is a conceptual diagram illustrating a data retransmission method of a transmission end using a randomized linear coding method serving as a representative data-block processing method according to the present invention.

FIG. 8c is a status diagram between the data retransmission method of FIG. 8a and the randomized linear coding method of FIG. 6.

Under the initial status 801, the transmission end initializes a system. The transmission end receives the SDU from the upper layer.

Under the division status 802, the transmission end determines the size of a data block to be created by the SDU division. Therefore, the transmission end divides the SDU into s-sized parts, such that it generates the PDU. In this case, the PDU is hereinafter referred to as original data.

Under the selection status 803, the transmission end determines the number (n) of data blocks to be contained in the data block set. The transmission end binds data blocks into N units, and configures the data block set. The number (n) of data blocks may be determined by at least one of channel environments of a communication network, performances of the transmission/reception ends, or requirements of an application program.

Under the coefficient generation status 804, the transmission end generates a row of the coefficient matrix according to the number (n) of data blocks. The above-mentioned coefficient matrix row is repeatedly generated until the number of rows reaches "n". The above coefficient generation status 804 generates the coefficient matrix to summarize the randomized linear coding method.

Under the dependency decision status 805, the transmission end performs a dependency check between rows of the coefficient matrix. During the dependency check time, the first row of the coefficient matrix is always a linear independent row. However, rows of each coefficient matrix generated after the first row has been generated pass through the dependency check between the first row and other rows prior to the first row. That is, the transmission end performs the dependency check for coefficients which have been generated to encode data blocks contained in the same data block set. If the dependency check has been conducted, and a coefficient matrix linearly-dependent on the set of previous coefficient rows is generated, a new coefficient must be re-generated. Therefore, the transmission end returns to the coefficient generation status 804.

The reason why the transmission end has performed the dependency check is to recover original data on the condition that rows of each matrix are independent of each other and coded data blocks are decoded. If rows of the coefficient matrix are dependent, unexpected errors may occur during the decoding process of data. The linear dependency indicates that a single vector is created by linear extension of other vectors. That is, a predetermined scalar is multiplied by the other vectors, such that the above single vector is created. For example, the set (a) is denoted by a=(2, 3, 5, 8), and the other set (b) is denoted by b=(4, 6, 10, 16). This status is considered to be the linear dependent status.

Under the coding status 806, the transmission end encodes the data blocks using the coefficient matrix and N number of original data blocks contained in the data block set. In the above coefficient matrix, individual rows are linearly dependent on each other. Under the coding status 806, the randomized linear coding method of Equation 1 may be applied to the above coding status 806. As data is coded by the randomized linear coding method, the data processing errors are obviated in the wired/wireless section, and the reliable communication can be conducted in the same wired/wireless section.

Under the transmission status 807, the transmission end can apply the data retransmission method of FIG. 8a or 8b.

Under the transmission status 807, the transmission end transmits the coded data created by the randomized linear coding method to the reception end.

Until N numbers of coded data blocks are transmitted, the transmission end performs coefficient generation 804, determines the dependency decision 805, performs the coding 806, and transmits the coded data block transmission 807. The above-mentioned processes 804, 805, 806, and 807 are repeated at step 807c.

The transmission end enters the timer status 808 after transmitting N number of coded data blocks. The transmission end waits for reception of the ACK signal under the timer status.

Under the timer status 808, if the transmission end receives the ACK signal before the timer has expired (i.e., prior to a timeout of the timer), it returns to the selection status 803, and is ready to generate a new data block set at step 808a.

If the transmission end receives the ACK signal and completely transmits original data (SDU) under the timer status 808, it is unable to create a new data block set. Therefore, the transmission end enters the initial status 801, and waits for new original data (SDU) at step 808b.

Under the timer status 808, if the transmission end does not receive the ACK signal and the timer has expired, the transmission end determines that transmission of faulty or erroneous data has occurred, and enters the coefficient generation status 804 at step 808c.

Under the coefficient generation status 804, the transmission end forms new coefficients so as to apply the randomized linear coding method. The transmission end prepares to re-generate another encoded data block, which is different from the previously transmitted encoded data block due to the same data block contents as well as the newly generated coefficients different from the original coefficients.

The transmission end performs the randomized linear coding on the re-generated data block, and enters the transmission status at step 807. In this case, the reception end can receive the ACK signal for the previous data block set (e.g., a first data block set) while transmitting a new data block set (e.g., a second data block set). In this case, the transmission end determines this ACK signal as a redundant ACK signal, enters the discard status 809, and ignores or discards this ACK signal at step 807d.

Under the transmission status, if the transmission end receives the ACK signal from the reception end, this indicates that the processing of the reception end associated with the corresponding data block set has been completely finished, such that the transmission end enters the selection status at step 807a. If original data has been completely transmitted, a new data block set cannot be generated, such that the transmission end enters the initial status and waits for new original data (SDU) at step 807b.

Figure 8D:
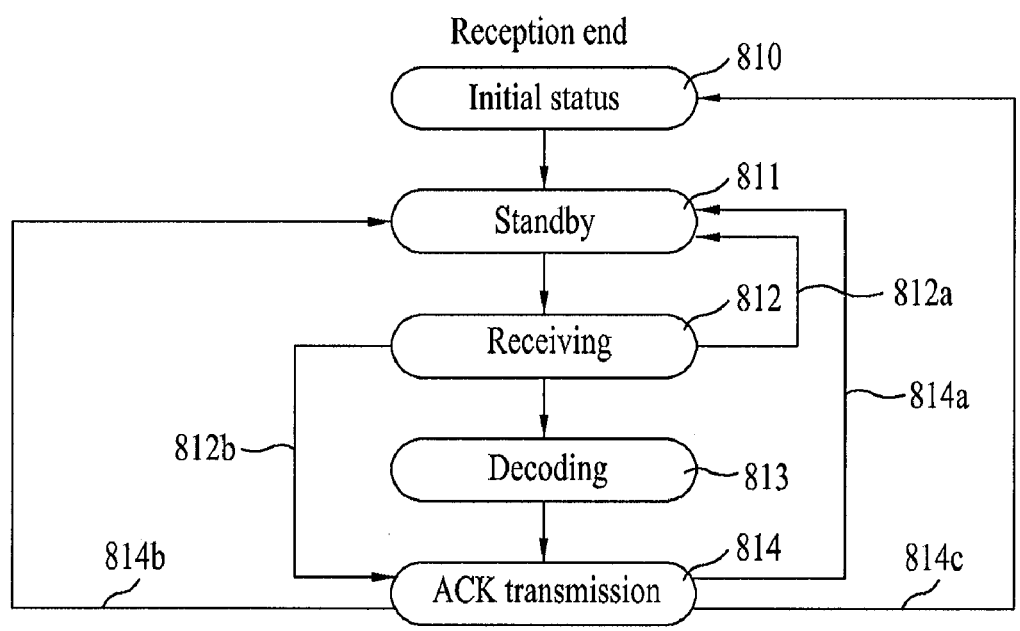
FIG. 8d is a conceptual diagram illustrating a data reception method of a reception end using a randomized linear decoding method serving as a representative data-block processing method according to the present invention.

FIG. 8d is a conceptual diagram illustrating a data reception method of a reception end using a randomized linear decoding method serving as a representative data-block processing method according to the present invention.

Referring to FIG. 8d, under the initial status 810, the reception end initializes a system status, and waits for initiation of communication of the transmission end.

Under the standby status 811, the reception end waits for reception of the coded data block to be transmitted by the transmission end.

Under the reception status 812, the reception end receives the randomized linear coding data blocks. If the coded data blocks have been normally received, the reception end enters the standby mode to receive a newly-coded data block at step 812a. The reception end repeats the above-mentioned processes until all the data blocks (i.e., N data blocks) contained in the data block set have been completely received.

If the reception end has normally received N data blocks, it enters the decoding mode 813. Under the decoding mode 813, the reception end may perform the randomized linear decoding on the received coded blocks using Equation 2.

If the decoding has been successfully completed under the decoding mode 813, the reception end enters the transmission mode of the ACK signal at step 814. Under the ACK signal transmission mode 814, the reception end transmits the ACK signal to the transmission end on the basis of a data block set. If there is no more original data to be received, the reception end enters the initial status 810 at step 814c. If the remaining original data to be received exist, the reception end enters the standby mode to receive a new coded data block at step 814b.

Under the reception status 812, if the reception end receives again the block of the already received and completely-decoded data from the transmission end, it may determine that the transmission end has failed to receive the ACK signal. Therefore, in order to retransmit the ACK signal of the pre-coded data block set, the reception end may enter the ACK signal transmission status at step 812b. The reception end retransmits the ACK signal indicating that the previous data block set has been normally received under the ACK signal transmission status at step 814a.

Figure 9A:
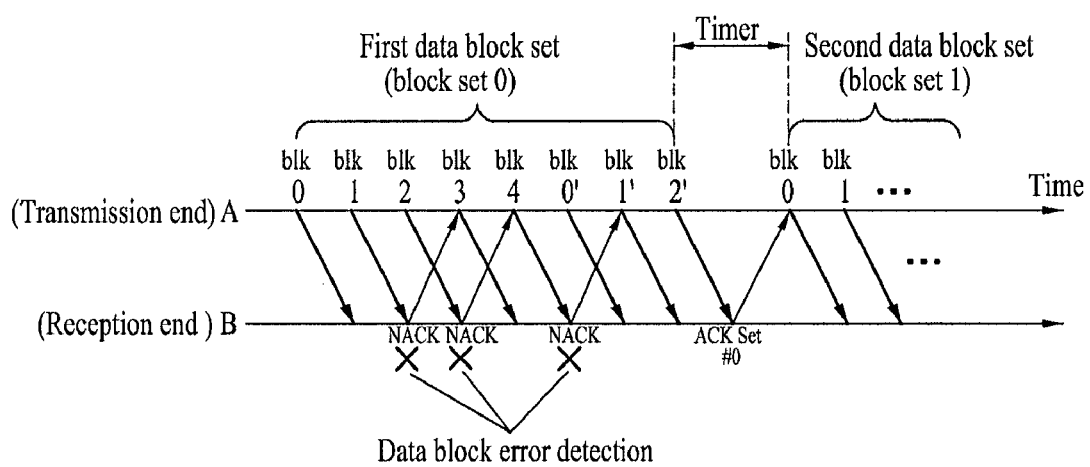
FIG. 9a is a conceptual diagram illustrating a data retransmission method according to another embodiment of the present invention.

FIG. 9a is a conceptual diagram illustrating a data retransmission method according to another embodiment of the present invention.

Referring to FIG. 9a, the reception end transmits the ACK signal to the transmission end on the basis of a data block set, and the NACK signal is transmitted to the transmission end on the basis of a data block.

In other words, the transmission end configures the first data block set (i.e., block set 0) using the SDU received from the upper layer. It is assumed that the number of data blocks contained in the first data block set is set to 5. The transmission end transmits the data blocks contained in the first data block set to the reception end. The reception end determines the presence or absence of an error in the received data block. There may be a variety of references capable of determining the presence or absence of any error, for example, a cyclic redundancy check CRC detection method.

If the reception end detects any errors, it transmits the NACK signal to the transmission end. This NACK signal indicates that the received data block has errors. If the data block has been lost so that there is no reception data block, the transmission end is unable to receive the ACK signal until the timer has expired. Therefore, if the timer has expired without receiving no ACK signal, operations of FIG. 8a are conducted.

If the transmission end receives the NACK signal, it reconstructs data blocks as many as the number of received NACK signals using the SDU, and retransmits the reconstructed data blocks to the reception end.

In FIG. 9a, NACK signals for faulty or erroneous three data blocks (blk1, blk2, and blk4) from among the data blocks received in the reception end are transmitted to the transmission end. In other words, the reception end requires at least three coded data blocks to recover original data. Therefore, the transmission end re-generates the data blocks (blk0' blk1', and blk2'), and transmits them to the reception end. As a result, the reception end has acquired all of N data blocks required for recovering data received from the upper layer, such that it can recover original data. The reception end transmits the ACK signal to the transmission end indicating that the data block set in units of a data block set has been normally received in the reception end itself.

If the ACK signal transmitted from the reception end is lost so that the transmission end does not receive the ACK signal during the predetermined timer period, the transmission end reconstructs the data block using the SDU as shown in FIG. 6. The transmission end transmits the reconstructed data to the reception end until receiving the ACK signal.

Figure 9B:
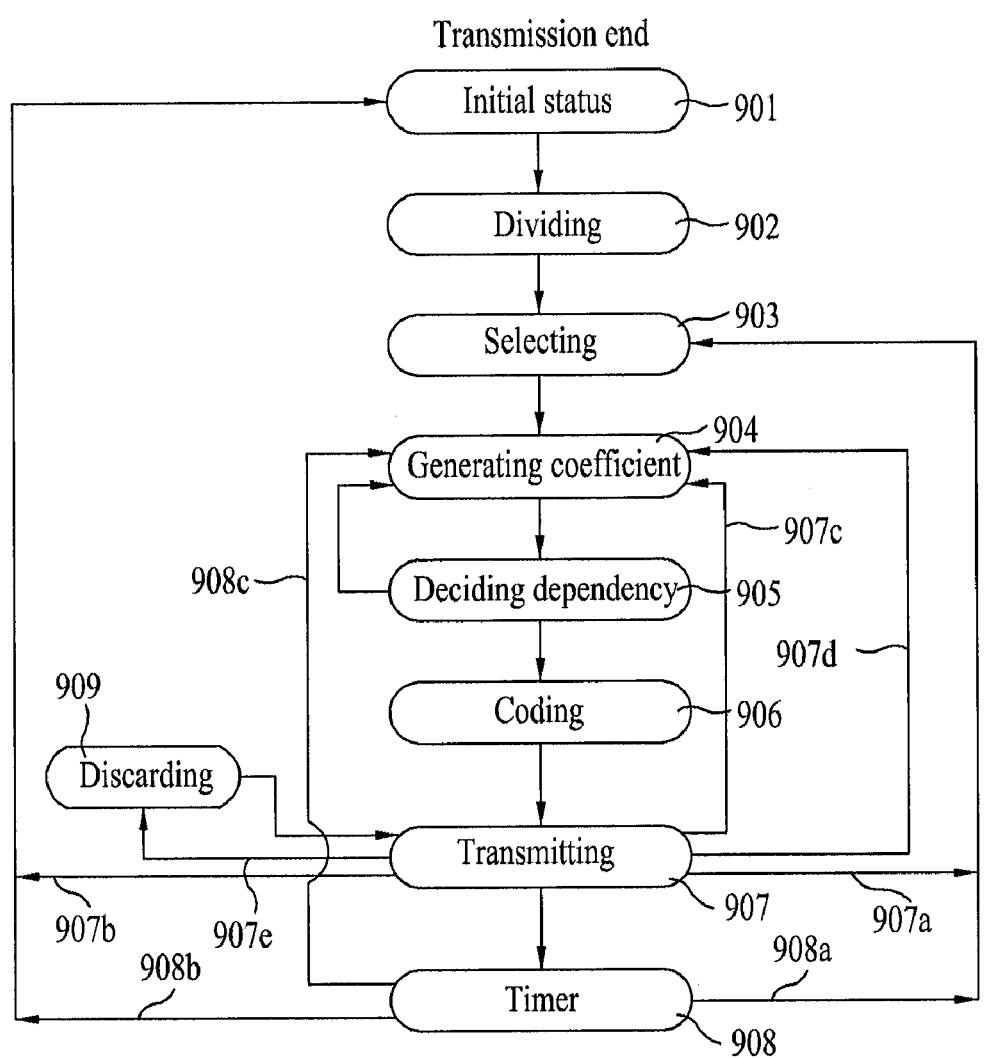
FIG. 9b is a conceptual diagram illustrating a data retransmission method of a transmission end using a randomized linear coding method serving as a representative data-block processing method according to another embodiment of the present invention.

FIG. 9b is a conceptual diagram illustrating a data retransmission method of a transmission end using a randomized linear coding method serving as a representative data-block processing method according to another embodiment of the present invention.

FIG. 9b is a status diagram between the data retransmission method of FIG. 9a and the randomized linear coding method of FIG. 6.

Under the initial status 901, the transmission end initializes a system, and waits for reception of the service data unit (SDU).

Under the data division status 902, the transmission end determines the size (s) of a data block, and divides the SDU into s-sized parts. Therefore, the transmission end divides the SDU into s-sized parts, such that it generates the PDU. In this case, the PDU is hereinafter referred to as original data.

Under the selection status 903, the transmission end determines the number (n) of data blocks to be contained in the data block set. The transmission end binds data blocks into N units, and configures the data block set. The number (n) of data blocks may be determined by at least one of channel environments of a communication network, performances of the transmission/reception ends, or requirements of an application program.

Under the coefficient generation status 904, the transmission end generates a row of the coefficient matrix according to the number (n) of data blocks. The above-mentioned coefficient matrix row is repeatedly generated until the number of rows reaches "n".

Under the dependency decision status 905, the transmission end performs the dependency check between rows of the coefficient matrix. During the dependency check time, the first row of the coefficient matrix is always a linear independent row. However, rows of each coefficient matrix generated after the first row has been generated pass through the dependency check between the first row and other rows prior to the first row. That is, the transmission end performs the dependency check for coefficients which have been generated to encode data blocks contained in the same data block set. If the dependency check has been conducted, and a coefficient matrix linearly-dependent on the set of previous coefficient rows is generated, a new coefficient must be re-generated. Therefore, the transmission end returns to the coefficient generation status 904 at step 905.

The reason why the transmission end has performed the dependency check is to recover original data on the condition that rows of each matrix are independent of each other and coded data blocks are decoded. If rows of the coefficient matrix are dependent, unexpected errors may occur during the decoding process of data.

Under the coding status 906, the transmission end encodes the data blocks using the coefficient matrix and N number of original data blocks contained in the data block set. In the above coefficient matrix, individual rows are linearly dependent on each other. Under the coding status 906, the randomized linear coding method of Equation 1 may be applied to the above coding status 906. As data is coded by the randomized linear coding method, the data processing errors are obviated in the wired/wireless section, and the reliable communication can be conducted in the same wired/wireless section.

Under the transmission status 907, the transmission end can apply the data retransmission method of FIG. 9a. Under the transmission status 907, the transmission end transmits the coded data created by the coding method to the reception end. Under the transmission status 907, if the ACK signal indicating that the pre-encoded data block set (e.g., the second data block set) has been normally received is received one or more times, the transmission end enters the discard status from the time at which the ACK signal is received at least two times at step 907e.

Under the discard status 909, the second and more ACK signals received in the transmission end are redundant ACK signals caused by the propagation delay, such that the transmission end discards or ignores the redundant ACK signals.

Until N numbers of coded data blocks are transmitted, the transmission end performs coefficient generation 904, determines the dependency decision 905, performs the coding 906, and transmits the coded data block transmission 907. The above-mentioned processes 904, 905, 906, and 907 are repeated at step 907c.

Under the transmission status 807, if the transmission end receives the NACK signal for faulty or erroneous data blocks, it determines that the coded data block has not been normally transmitted to the reception end. Therefore, in order to transmit the new coded data block, the transmission end re-enters the coefficient generation status 904 at step 907d.

Under the timer status 908, the transmission end waits for the ACK signal indicating that the data block set of the reception end has been normally received. If the transmission end receives the ACK signal before the timer has expired, it removes the currently-generated data block set, and enters the selection status 903. The transmission end is ready to generate a new data block set under the selection status at step 908a.

In this case, if the transmission end has completely transmitted all of total data, it is unable to make a new block data set, enters the initial status 901, and waits for another original data at step 908b.

If the timer has expired or the transmission end receives the NACK signal, the transmission end determines that the reception end has abnormally received the coded data block. Therefore, the transmission end enters the coefficient generation status 904, and is ready to make a new coded data block at step 908c.

The transmission end generates a new coefficient under the coefficient generation status 904, and is ready to generate a new coded data block having the same contents as those of the pre-transmitted data block.

Thereafter, the transmission end codes the data block generated under the coding status 906, enters the transmission status 907, and transmits the coded data block to the reception end.

In the case of operations activated by the NACK signal received in the transmission end, the transmission end transmits regenerated coded data blocks as many as the number of Rx NACK signals to the reception end. If the timer has expired, it is unable to recognize how many data blocks have been lost or damaged. Therefore, the transmission end generates a maximum of N coded data blocks in the data block set, and sequentially transmits the N coded data blocks to the reception end until receiving the ACK signal. In this case, if the transmission end receives the ACK signal, this means that the process of the reception end for the corresponding data block set has been completed, such that the transmission end enters the selection status at step 907a. If the original data (SDU) has been completely transmitted, the transmission end is unable to configure a new data block, such that it enters the initial status and waits for new original data at step 907b.

Figure 9C:
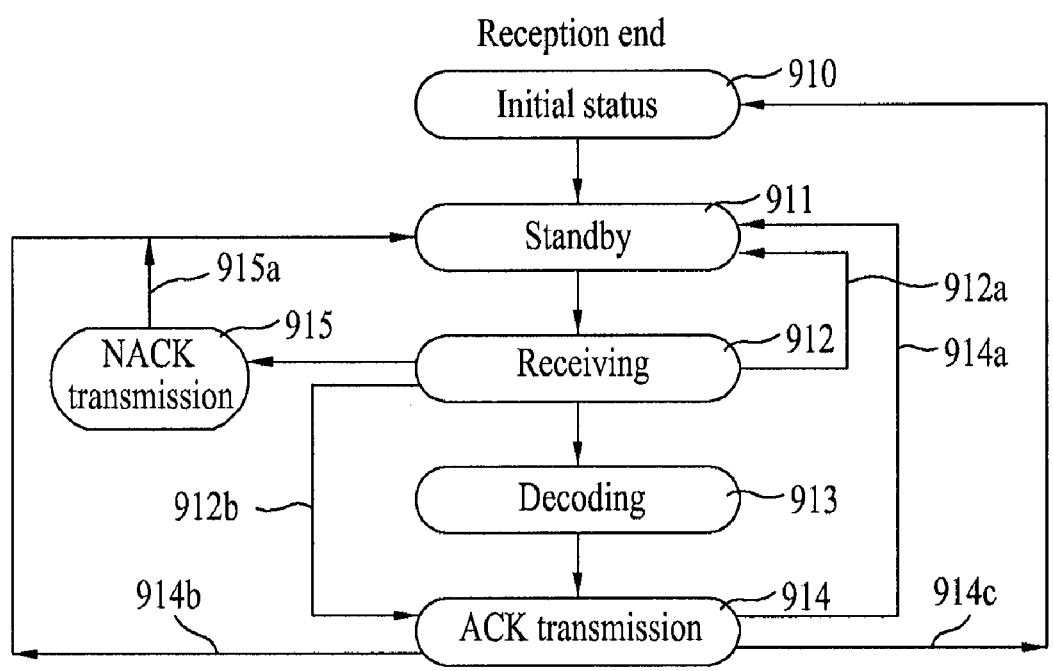
FIG. 9c is a conceptual diagram illustrating a data reception method of a reception end using a randomized linear decoding method serving as a representative data-block processing method according to another embodiment of the present invention.

FIG. 9c is a conceptual diagram illustrating a data reception method of a reception end using a randomized linear decoding method serving as a representative data-block processing method according to another embodiment of the present invention.

Referring to FIG. 9c, under the initial status 910, the reception end initializes the system status, and waits for communication initiation of the transmission end. If the number (n) of data blocks contained in the data block set is decided, the reception end waits for the coded data block to be transmitted from the transmission end under the standby status 911.

Under the reception status 912, the reception end receives the data block transmitted from the transmission end. In this case, the reception end detects whether the encoded data block has any errors. There may be a variety of methods for allowing the reception end to determine the presence or absence of errors. In one embodiment of the error detection method, a cyclic redundancy check (CRC) method may be exemplarily used as a representative error detection method.

The above-mentioned CRC error detection method considers a data bit as a single long binary number. The reception end divides the data bit denoted by the binary number by a primitive divisor, and adds the remainder as a redundant bit to the data bit. When the reception end receives a single frame, it compares a first remainder acquired when the division has been performed by the same primitive divisor with a second remainder contained in the received frame, such that it can detect the error according to the result of the comparison.

If the data block received in the reception end has any errors, the reception end enters the NACK transmission status 915. Under the NACK transmission status 915, the reception end transmits the NACK signal to the transmission end on the basis of a data block. After the reception end transmits the NACK signal, it enters the standby status 911 to receive other data blocks.

Under the reception status 912, provided that all the data blocks contained in the coded data block set have been normally received in the reception end without any errors, the reception end enters the standby status to receive other coded data blocks at step 912a.

In this case, the coded data block received in the standby status 911 may be considered to be a data block contained in a previous data block set (e.g., a first data block set) which has already been decoded. In this case, the reception end determines that the transmission end has abnormally received the ACK signal. Therefore, in order to retransmit the ACK signal indicating that the previous data block set has been completely received, the reception end enters the ACK transmission status 914 at step 912b. Under the ACK transmission status 914, the reception end retransmits the ACK signal indicating that a current data block is a data block contained in the previous data block set at step 914a.

If the reception end has normally received N number of data blocks, it enters the decoding status 913.

Under the decoding status 913, the reception end decodes the coded data block by applying the randomized linear decoding method to the Rx coded data block. The decoding process is conducted by the reception end using Equation 3.

If the decoding has been successfully completed in the reception end, the reception end enters the ACK transmission status 914. Under the ACK transmission status 914, the reception end transmits the ACK signal in units of a data block set. If there is no more original data to be received in the reception end, the reception end enters the initial status at step s914c. If the remaining original data to be received exists, the reception end enters the standby status 911 to receive the newly-encoded data block at step 914a.

Figure 10A:
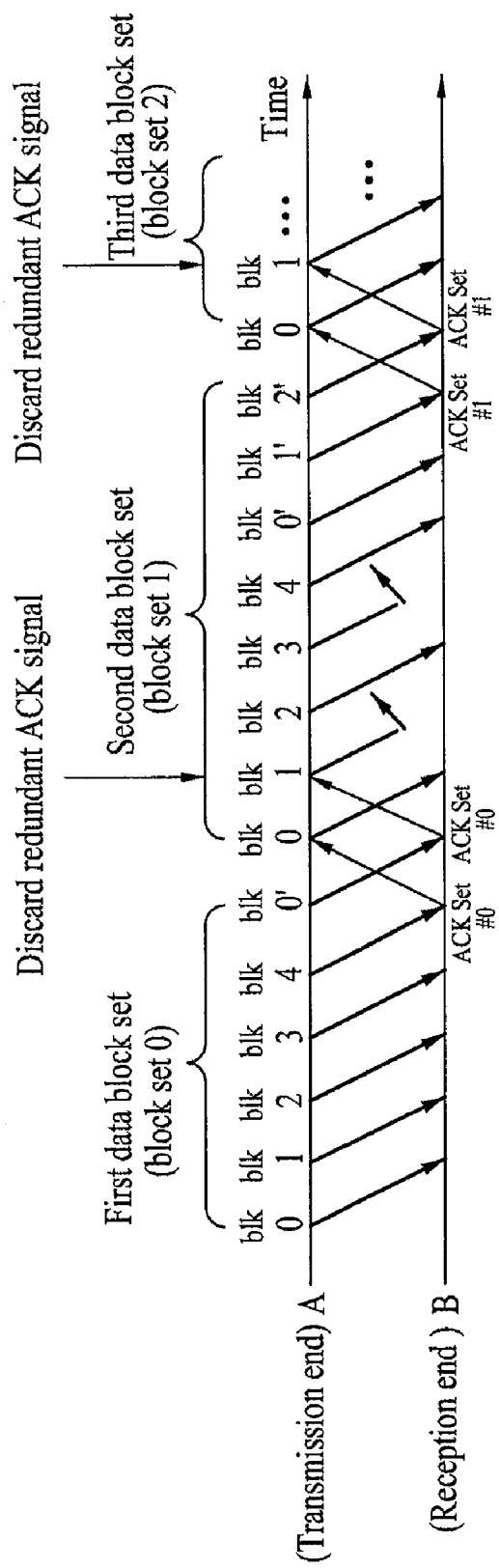
FIG. 10a a conceptual diagram illustrating a data retransmission method according to still another embodiment of the present invention.

FIG. 10a is a conceptual diagram illustrating a data retransmission method according to yet another embodiment of the present invention.

Referring to FIG. 10a, the transmission end configures a first data block set (i.e., block set 0) using upper-layer data. In one embodiment of the present invention, the number (n) of data blocks is set to 5.

The transmission end sequentially transmits data blocks contained in the first data block set (i.e., block set 0) to the reception end. However, after all the data blocks contained in the data block set have been completely transmitted, the transmission end reconstructs the data block (blk0') using the upper-layer data until the reception end transmits the ACK signal. Due to propagation delay generated when the reception end transmits the ACK signal, the transmission end has not received the ACK signal during the transmission of the data block (blk0'), such that the above data block (blk0') is reconstructed and transmitted to the reception end.

The reception end sequentially receives the coded data blocks. If the reception end receives the last coded data block (blk4) such that the contents of original upper-layer data can be normally recovered, the reception end transmits the ACK signal to the transmission end on the basis of a data block set.

Whenever a data block is received in the reception end, the reception end determines the presence or absence of any errors in the corresponding data block. There may be a variety of error detection methods, for example, a CRC method. In this embodiment, although errors are detected in the corresponding data block, the reception end does not transmit the NACK signal. If original data cannot be recovered due to the occurrence of errors in the reception end, the reception end discards the corresponding data block set.

In FIG. 10a, the data block (blk0') contained in the first data block set received in the reception end is equal to a data block contained in the first data block set (block set 0) which has already been processed. Therefore, the reception end retransmits the ACK signal as a redundant signal. If the transmission end receives the redundant ACK signal, this received ACK signal is equal to the pre-received ACK signal, such that this ACK signal is discarded.

The transmission end constructs the second data block set (block set 2) using upper-layer data. The transmission end sequentially transmits data blocks contained in the second data block to the reception end until receiving the ACK signal.

While the reception end receives the data block, data blocks (blk1 and blk3) contained in the second data block set are lost, such that they are abnormally received. Therefore, all the data blocks (i.e., 5 data blocks) required for recovering original data are not received, such that the reception end does not transmit the ACK signal, and waits for reception of the next data block.

Since the transmission end does not receive the ACK signal, it does not configure the third data block set (block set 2). The transmission end adds the reconstructed coded data blocks (blk0', blk1', and blk2') to the second data block set using upper-layer data. The transmission end transmits the reconstructed coded data blocks to the reception end.

The reception end sequentially transmits the above reconstructed data blocks. If the reception end receives coded data blocks (blk0' and blk1') as many as the lost data blocks, it can recover original data. Therefore, the reception end transmits the ACK signal to the transmission end on the basis of a data block set.

During the data transmission, the reception end may further receive another data block (blk2') due to the propagation delay. The reception end receives the same data block (blk2') as the pre-recovered original data, such that it retransmits the ACK signal to the transmission end. The transmission end discards the retransmitted redundant ACK signal.

Figure 10B:
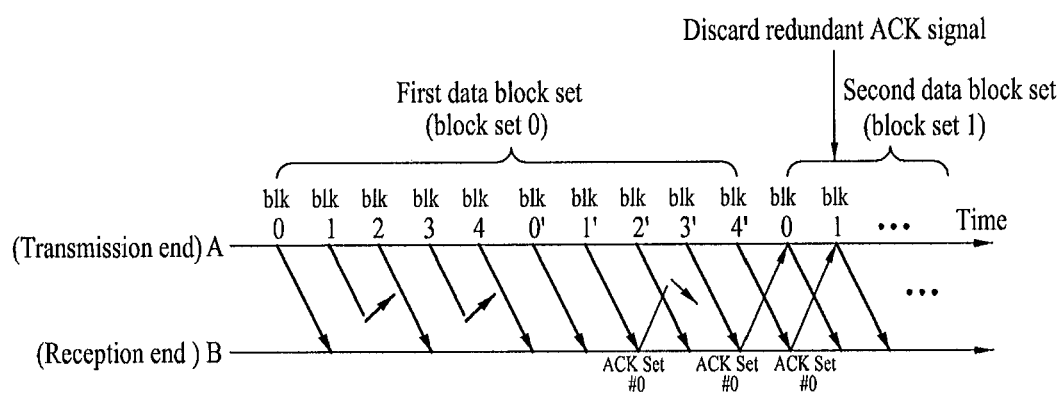
FIG. 10b is a conceptual diagram illustrating a data retransmission method and a method for processing erroneous ACK signals according to still another embodiment of the present invention.

FIG. 10b is a conceptual diagram illustrating a data retransmission method and a method for processing erroneous ACK signals according to still another embodiment of the present invention.

In FIG. 10b, basic data processing steps are equal to those of FIG. 10a.

Provided that the reception end receives all the data blocks contained in the data block set and is able to normally recover original data, the reception end transmits the ACK signal on the basis of a data block set. If the ACK signal transmitted from the reception end has been lost or damaged, the following processes will be conducted.

Although all the data blocks contained in the first data block set (block set 0) have been completely transmitted, the transmission end may not receive the ACK signal. In this case, the transmission end determines that the reception end has not recovered original data corresponding to the first data block set. Therefore, the transmission end does not configure the second data block set (block set 1), and performs operations for processing the transmission errors.

Referring to FIG. 10b, the transmission end generates the coded data block using data received from the upper layer until receiving the ACK signal. The transmission end performs the randomized linear coding on the data blocks (blk0', blk1', blk2', blk3', and blk4'), and includes the resultant data blocks in the coded first data block. The transmission end transmits the coded data blocks to the reception end via a transmission layer.

After transmitting the ACK signal on the basis of a data block set, the reception end waits for reception of the data blocks contained in the second data block set (block set 1). In this case, if a data block contained in the first data block set (block set 0) which has been successfully recovered is retransmitted, it retransmits the redundant ACK signal to the transmission end. In other words, the reception end retransmits the ACK signal, such that it indicates that there is no need to receive more data blocks contained in the first data block set. The transmission end receiving the ACK signal deletes the pre-reconstructed data blocks, configures the coded second data block set (block set 1), and transmits it to the reception end.

The transmission end transmits the pre-generated data block (blk4') to the reception end, because the ACK signal retransmitted from the reception end has been transmitted late to the transmission end due to the propagation delay. The reception end receiving the data block (blk4') transmits a redundant ACK signal to the transmission end because the data block (blk4') is equal to the pre-recovered original data. In this case, the transmission end configures the second data block set are in progress, such that it ignores or discards the retransmitted redundant ACK signal.

Figure 10C:
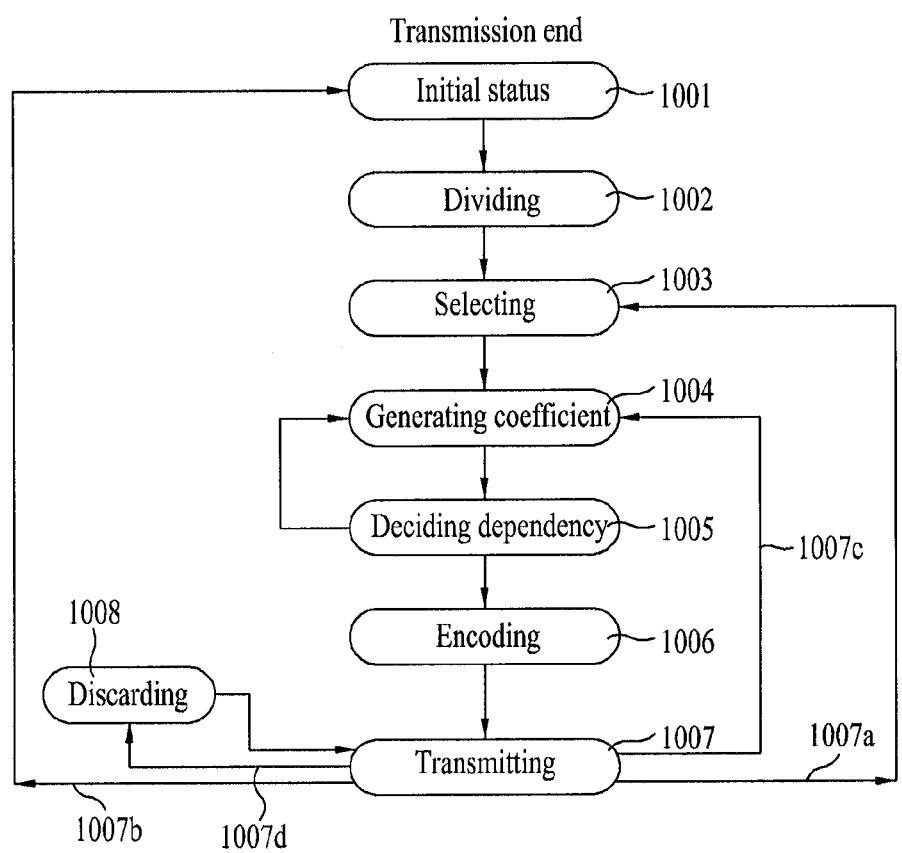
FIG. 10c is a conceptual diagram illustrating a data retransmission method of a transmission end using a randomized linear coding method serving as a representative data-block processing method according to still another embodiment of the present invention.

FIG. 10c is a conceptual diagram illustrating a data retransmission method of a transmission end using a randomized linear coding method serving as a representative data-block processing method according to yet another embodiment of the present invention.

FIG. 10c is a status diagram between the data retransmission method of FIG. 10a and the randomized linear coding method of FIG. 6.

Under the initial status 1001, the transmission end initializes a system, and waits for reception of the service data unit (SDU).

Under the data division status 1002, the transmission end determines the size (s) of a data block, and divides the SDU into s-sized parts. Therefore, the transmission end divides the SDU into s-sized parts, such that it generates the PDU. In this case, the PDU is hereinafter referred to as original data.

Under the selection status 1003, the transmission end determines the number (n) of data blocks to be contained in the data block set. The transmission end binds data blocks into N units, and configures the data block set. The number (n) of data blocks may be determined by at least one of channel environments of a communication network, performances of the transmission/reception ends, or requirements of an application program.

Under the coefficient generation status 1004, the transmission end generates a row of the coefficient matrix according to the number (n) of data blocks. N rows are repeatedly generated to construct the coefficient matrix.

Under the dependency decision status 1005, the transmission end performs the dependency check between rows of the coefficient matrix. During the dependency check time, the first row of the coefficient matrix is always a linear independent row. However, rows of each coefficient matrix generated after the first row has been generated pass through the dependency check between the first row and other rows prior to the first row. That is, the transmission end performs the dependency check for coefficients which have been generated to encode data blocks contained in the same data block set. If the dependency check has been conducted, and a coefficient matrix linearly-dependent on the set of previous coefficient rows is generated, a new coefficient must be re-generated. Therefore, the transmission end returns to the coefficient generation status 1004.

The reason why the transmission end has performed the dependency check is to recover original data in the reception end. Under the condition that rows of each matrix must be independent of each other, the reception end can recover original data even when the coded data blocks are decoded. If rows of the coefficient matrix are dependent, unexpected errors may occur during the decoding process of data.

Under the coding status 1006, the transmission end encodes the data blocks using the coefficient matrix and N number of original data blocks contained in the data block set. In the above coefficient matrix, individual rows are linearly dependent on each other. Under the coding status 906, the randomized linear coding method of Equation 1 may be applied to the above coding status 1006. As data is coded by the randomized linear coding method, the data processing errors are obviated in the wired/wireless section, and the reliable communication can be conducted in the same wired/wireless section.

Under the transmission status 1007, the transmission end can apply the data retransmission method of FIG. 10a. Under the transmission status 1007, the transmission end transmits the coded data created by the coding method to the reception end. Until N data blocks are completely transmitted, the transmission end performs coefficient generation, determines the dependency decision, performs the coding, and transmits the coded data block transmission. The above-mentioned processes are repeated at step 1007c.

If the transmission end receives the ACK signal under the transmission status 1007, it deletes all the data block sets, enters the selection status 1003, and is ready to generate a new data block set at step 1007a. If the transmission end has transmitted all of original data, it is unable to generate a new data block set, enters the initial status 1001, and waits for new original data at step 1007b.

While the transmission end transmits a new data block set (e.g., a second data block set), it re-confirms that the reception end has completely received the previous data block set (e.g., the first data block set) and original data has been successfully recovered, such that it may receive a redundant ACK signal if required. In this case, the redundant ACK signal relates to the coded data block which has been regenerated as a redundant data block and has been transmitted, such that the transmission end discards or ignores the redundant ACK signal at step 1008.

Figure 10D:
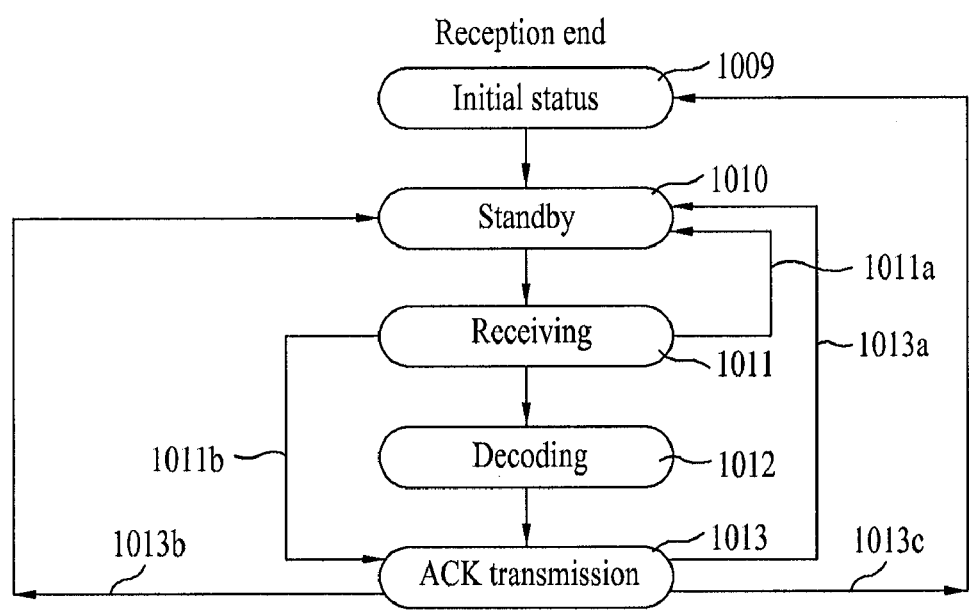
FIG. 10d is a conceptual diagram illustrating a data reception method of a reception end using a randomized linear decoding method serving as a representative data-block processing method according to still another embodiment of the present invention.

FIG. 10*d* is a conceptual diagram illustrating a data reception method of a reception end using a randomized linear decoding method serving as a representative data-block processing method according to yet another embodiment of the present invention.

Referring to FIG. 10*d*, under the initial status 1009, the reception end initializes the system status, and waits for communication initiation of the transmission end. In order to employ the randomized linear decoding method acting as an exemplary data processing method, the transmission end and the reception end determine the number (n) of data blocks contained in the data block set.

Under the standby status 1010, if "n" is decided, the reception end waits for the coded data block to be transmitted from the transmission end. The value "n" may be decided in consideration of channel environments, performances of the transmission/reception ends, or requirements of an application program.

Under the reception status 1011, the reception end receives the coded data block. If the above data block has been normally received, the reception end enters the standby status to receive a new coded data block at step 1011*a*. The above steps 1010~1011 are repeated until N data blocks are received.

The data block received in the reception end may be considered to be a data block contained in a pre-coded data block set which has already been decoded. In this case, the reception end determines that the transmission end has abnormally received the ACK signal indicating that the data block set has been normally received. Therefore, in order to retransmit the ACK signal associated with the pre-coded data block set, the reception end enters the ACK transmission status at step 1011*b*. Under the ACK transmission status 914, the reception end retransmits the ACK signal indicating that a current data block is a coded data block associated with the previous data block set at step 1013*a*.

If the reception end has normally received N number of data blocks, it enters the decoding status 1012. Under the decoding status 1012, the reception end may use the randomized linear decoding method acting as the exemplary data processing method of FIG. 6. The reception end performs the decoding on the received coded data blocks using the randomized linear decoding method.

If the decoding has been successfully completed, the reception end enters the ACK transmission status 1013. Under the ACK transmission status 1013, the transmission end transmits the ACK signal in units of a data block set. If there is no more original data to be received in the reception end, the reception end enters the initial status at step 1013*c*. If the remaining original data to be received exists, the reception end enters the standby status 1010 to receive the newly-encoded data block at step 1013*a*.

It should be noted that most terminology disclosed in the present invention is defined in consideration of functions of the present invention, and can be differently determined according to intention of those skilled in the art or usual practices. Therefore, it is preferable that the above-mentioned terminology be understood on the basis of all contents disclosed in the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

[Industrial Applicability]

As apparent from the above description, the present invention provides a data retransmission method for use in a wireless access system. A communication system according to the present invention prevents faulty or erroneous data from being generated in the wired/wireless section according to the data processing method, and can guarantee reliable communication. The transmission end does not generate unnecessary ACK/NACK signals using the data retransmission method, and can seamlessly transmit information, resulting in reduction of a data-transfer delay time.

The invention claimed is:

1. An automatic repeat request (ARQ) method for use in a communication system, the method comprising:
   constructing a data block set including a plurality of data blocks using data received from an upper layer;
   transmitting the plurality of data blocks contained in the data block set to a reception end; and
   if a predetermined time elapses without receiving any acknowledgement (ACK) signal after transmitting a last data block among the plurality of data blocks, transmitting at least one data block reconstructed from the data received from the upper layer to the reception end until an acknowledgment (ACK) signal is received from the reception end,
   wherein a number of the transmitted at least one data block is equal to a number of received non-acknowledgment (NACK) signals,
   wherein the acknowledgment (ACK) signal is received from the reception end in response to the data block set when all of the plurality of data blocks of the data block set have been successfully received by the reception end, and
   wherein each of the NACK signals is received from the reception end in response to each data block of the plurality of data blocks when each data block has not been successfully received by the reception end.

2. The automatic repeat request (ARQ) method according to claim 1, wherein individual data blocks contained in the data block set are independent of each other.

3. The automatic repeat request (ARQ) method according to claim 1, wherein the plurality of data blocks are generated by encoding the data using a coefficient matrix, and the encoded data blocks are independent of each other.

4. The automatic repeat request (ARQ) method according to claim 1, wherein the predetermined time is set by a timer in a transmission end.

5. An automatic repeat request (ARQ) method for use in a communication system, the method comprising:
   constructing a data block set including a plurality of data blocks using data received from an upper layer;
   transmitting the plurality of data blocks contained in the data block set to a reception end; and
   if one or more non-acknowledgement (NACK) signals are received from the reception end during the transmission of the plurality of data blocks contained in the data block set,
   reconstructing a number of data blocks equal to a number of received NACK signals using the data received from the upper layer, and transmitting the reconstructed data blocks to the reception end after receiving all of the non-acknowledgement (NACK) signals from the reception end,
wherein an acknowledgment (ACK) signal is received from the reception end in response to the data block set when the data block set has been successfully received by the reception end, and
wherein each of the NACK signals is received from the reception end in response to each data block of the plurality of data blocks when each data block has not been successfully received by the reception end.

6. The automatic repeat request (ARQ) method according to claim 5, wherein individual data blocks contained in the data block set are independent of each other.

7. The automatic repeat request (ARQ) method according to claim 5, further comprising:
if a predetermined time elapses without receiving any acknowledgement (ACK) signal after transmitting a last data block among the plurality of data blocks, transmitting at least one data block reconstructed from the data received from the upper layer to the reception end until the acknowledgment (ACK) signal is received from the reception end.

8. The automatic repeat request (ARQ) method according to claim 7, wherein the predetermined time is set by a timer in a transmission end.

9. The automatic repeat request (ARQ) method according to claim 5, wherein the plurality of data blocks are generated by encoding the data using a coefficient matrix, and the encoded data blocks are independent of each other.

10. An automatic repeat request (ARQ) method for use in a communication system, the method comprising:
receiving a plurality of data blocks contained in a data block set from a transmission end;
transmitting at least one non-acknowledgement (NACK) signal to the transmission end in response to at least one data block among the plurality of data blocks contained in the data block set if the at least one data block is not successfully received;
receiving at least one data block reconstructed by the transmission end in response to the at least one non-acknowledgment (NACK) signal, wherein a number of the reconstructed at least one data block is equal to a number of the transmitted non-acknowledgment (NACK) signals; and
transmitting an acknowledgment (ACK) signal in data block set units to the transmission end in response to the data block set if the plurality of data blocks contained in the data block set are all successfully received.

11. The automatic repeat request (ARQ) method according to claim 10, further comprising:
decoding the plurality of data blocks contained in the received data block set using an inverse matrix of a coefficient matrix to recover original data.

12. The automatic repeat request (ARQ) method according to claim 10, wherein the reconstructed at least one data block is received after transmitting all of the non-acknowledgement (NACK) signals.

* * * * *